US012599878B2

(12) United States Patent
Schoeck et al.

(10) Patent No.: US 12,599,878 B2
(45) Date of Patent: Apr. 14, 2026

(54) MIXING SEGMENT FOR A STATIC MIXER

(71) Applicant: medmix Switzerland AG, Haag (CH)

(72) Inventors: Joachim Schoeck, Winterthur (CH); Christoph Streit, Haag (CH)

(73) Assignee: medmix Switzerland AG, Haag (CH)

(*) Notice: Subject to any disclaimer, the term of this patent is extended or adjusted under 35 U.S.C. 154(b) by 595 days.

(21) Appl. No.: 18/016,303

(22) PCT Filed: Sep. 3, 2021

(86) PCT No.: PCT/EP2021/074325
§ 371 (c)(1),
(2) Date: Jan. 13, 2023

(87) PCT Pub. No.: WO2022/058180
PCT Pub. Date: Mar. 24, 2022

(65) Prior Publication Data

US 2023/0271147 A1 Aug. 31, 2023

(30) Foreign Application Priority Data

Sep. 17, 2020 (EP) .................................... 20196700

(51) Int. Cl.
*B01F 25/00* (2022.01)
*B01F 25/431* (2022.01)
*B01F 25/4314* (2022.01)
*B01F 25/432* (2022.01)

(52) U.S. Cl.
CPC ...... *B01F 25/4323* (2022.01); *B01F 25/4314* (2022.01); *B01F 25/431971* (2022.01); *B01F 25/4321* (2022.01)

(58) Field of Classification Search
CPC .............. B01F 25/4323; B01F 25/4314; B01F 25/4321; B01F 25/431971
See application file for complete search history.

(56) References Cited

U.S. PATENT DOCUMENTS

2004/0130967 A1 7/2004 Wolf et al.
2013/0301379 A1* 11/2013 Neerincx ............... B29C 48/21
366/340

FOREIGN PATENT DOCUMENTS

DE 10248540 A1 4/2004
WO 2009039477 A1 3/2009
WO 2012095457 A1 7/2012

OTHER PUBLICATIONS

International Search Report issued Dec. 23, 2021 in corresponding International Application No. PCT/EP2021/074325.

* cited by examiner

*Primary Examiner* — Anshu Bhatia
(74) *Attorney, Agent, or Firm* — Spencer Fane, LLP

(57) ABSTRACT

A mixing segment for a static mixer has one inlet section, one outlet section dis-posed opposite of the inlet section, and a longitudinal axis being defined be-tween the inlet section and the outlet section. The mixing segment further has a plurality of first passages, each first passage adjoining the inlet section and being arranged radially with respect to the longitudinal axis, and at least one second passage adjoining the outlet section and being arranged radially with respect to the longitudinal axis. The first passages are in fluid connec-tion with the second passage with flow paths being defined between the inlet section, said first pas-sages, the second passage and the outlet section.

18 Claims, 32 Drawing Sheets

MIXING SEGMENT FOR A STATIC MIXER

CROSS-REFERENCE TO RELATED APPLICATION

This application is a U.S. National Stage Application of International Application No. PCT/EP2021/074325, filed Sep. 3, 2021, which claims priority to European Application No. 20196700.7 filed Sep. 17, 2020, the contents of each of which are hereby incorporated by reference.

BACKGROUND

Technical Field

The present disclosure relates to a mixing segment for a static mixer, and a static mixer having one or more mixing segment.

Background Information

Conventional static mixers are employed to mix individual components of multi-component materials, such as adhesives, dental material or the like, prior to application. Usually, high viscosity materials are thereby mixed in laminar flow. After mixing, the mixture usually cures due to chemical reactions and hardens thereupon. The physical and chemical properties of the cured material usually depend on the homogeneity of the mixture produced by the static mixer and improve with increasing homogeneity.

SUMMARY

Static mixers comprise only fixed elements that do not move with respect to each other. Mixing is usually achieved at intersections that split and combine the material to be mixed. These intersections are usually sequentially located along a longitudinal axis of the static mixer, which can comprise several consecutive mixing segments that are identical in shape, size and/or design, which can either be arranged in parallel to one another or rotated by 90° and/or 180° with respect to one another. Since the homogeneity of the mixed material improves with the number of consecutive intersections along the longitudinal direction, static mixers that homogeneously mix the individual components and/or that are able to mix material components having largely different viscosities can have considerable lengths. This length can limit accessibility in many applications.

Accordingly, there is a need to provide a mixing segment and a static mixer that are configured to homogeneously mix multi-component materials and simultaneously exhibit short length.

The present disclosure provides a mixing segment for a static mixer and a static mixer having one or more mixing segments as described herein. Embodiments are given in the description and the drawings.

In one aspect, the present disclosure is directed at a mixing segment for a static mixer, having one inlet section, one outlet section disposed opposite of the inlet section, and a longitudinal axis being defined between the inlet section and the outlet section. The mixing segment further has a plurality of first passages, each first passage adjoining the inlet section and being arranged radially with respect to the longitudinal axis, with the plurality of first passages preferably extending radially and in particular at least substantially transverse or transverse to the longitudinal axis, and at least one second passage adjoining the outlet section and being arranged radially with respect to the longitudinal axis, with the at least one second passage preferably extending radially and in particular at least substantially transverse or transverse to the longitudinal axis. The first passages are in fluid connection with the second passage with flow paths being defined between the inlet section, the first passages, the second passage and the outlet section.

By arranging the first and second passages radially with respect to the longitudinal axis, the radial length of the first and second passages do not contribute to the longitudinal extent of the mixing segment so that the mixing segment can have a short overall length along the longitudinal axis. Despite this short longitudinal length, the individual flow paths can still have sufficient length due to their radial passages to achieve homogeneous mixing of the material components entering the inlet section of the mixing segment. With such a mixing segment, mixing can predominantly happen in parts of the flow paths that are radially arranged with respect to the longitudinal axis, for example, within the second passage. The mixing segment thus constitutes a radial mixing segment rather than a longitudinal mixing segment.

The mixing segment can have a single second passage or it can have more than one second passage, for example two, four, eight or sixteen second passages. Each second passage can be in fluid connection with an individual multitude of first passages. Each individual first passage can define a separate flow path from the inlet section to the outlet section. The individual first passages can be configured to split the incoming material from the inlet section into several portions propagating via the individual flow paths. At least part of the flow paths can then recombine in the at least one second passage upon mixing the material from the recombined flow paths. Each second passage can be configured to receive the material from the individual flow paths at radially outer parts and to mix the material upon propagation from the radially outer parts to a radially inner part of the second passage that is located at the longitudinal axis and connected to the outlet section.

Before recombination in the at least one second passage, the flow paths can become rearranged to further improve the mixing action of the mixing segment. For example, the mixing segment can be configured to distribute the flow paths in a way that material portions, which have been radially stacked in the inlet section, get circumferentially distributed around the longitudinal axis in the outlet section.

To achieve such a circumferential redistribution of material portions that are radially stacked at the inlet section, the mixing segment can, for example, have first passages that are consecutively connected to the inlet portion along the longitudinal axis and that are longitudinally aligned at the same circumferential position around the longitudinal axis. Flow paths defined by the first passages can then be circumferentially connected next to each other to the second passage. The longitudinally aligned first passages consecutively receive portions of the incoming material that are radially stacked perpendicular to the longitudinal axis. That is, a first passage that is located at the most upstream position receives material from a radially outermost portion of the inlet section and consecutive first passages receive material from more inward radial portions of the inlet section. Upon entering the at least one second passage, the individual material portions can become circumferentially distributed around the longitudinal axis and subsequently mixed by radially compressing the distribution during radially inward propagation through the second passage to the outlet section. This means that through the use of such a static mixer one can significantly reduce the length of the static mixer, as the mixing paths extend radially rather than in the longitudinal direction.

Additionally or alternatively, the mixing segment can be configured to distribute the flow paths in a way that material portions, which are circumferentially distributed next to each other at the inlet section, become radially stacked in the outlet section. To this end, the circumferentially distributed material portions can be guided by the individual flow paths to at least two second passages which are sequentially connected to the outlet section behind each other along the longitudinal axis. The flow paths connected to one of the second passages can then receive material from the inlet section at a first circumferential position and this second section can guide the material to a radially inner part of the outlet section. The flow paths connected to another one of the second passages can receive material from the inlet section at a second circumferential position that differs from the first position and that second passage can guide the mixed material to a radially outer part of the outlet section.

The mixing segment can be made of a plastic material, for example a thermoplastic material. The material can be a photopolymer, such as Photo-Resins X004M or UltraCur3D ST45, both offered by BASF 3D Printing Solutions GmbH, Heidelberg, Germany. Alternatively, the material can also be a ceramic or a metal material.

According to an embodiment, the outlet section is arranged in a central portion of the mixing segment at the longitudinal axis and the second passage comprises an outlet that is adjoined to the outlet section of the mixing segment at a radially inner part of the second passage. For example, the outlet can be positioned at a radially inner end of the second passage. The outlet of the second passage can be radially adjoined to the outlet section so that the outlet is positioned at a lateral surface of the outlet section that surrounds the longitudinal axis.

According to a further embodiment, the outlet section comprises a longitudinal cylindrical section and the second passage is radially connected to the cylindrical section. This enables connecting the second passage to the outlet section over a short longitudinal length and thus results in a mixing segment having small longitudinal dimensions.

The cylindrical section of the outlet section can, for example, be configured as a circular cylinder. Alternatively, the cylindrical section can have a polygonal cross-section, for example a rectangular or square cross-section. The cylindrical section can have a varying extent perpendicular the longitudinal axis. The extent can exhibit a continuous or a stepwise change along the longitudinal axis. For example, the extent or diameter of the cylindrical section can widen in a downstream direction along the longitudinal axis. If the mixing segment features more than one second passage, a first multitude of second passages can connect to the cylindrical section at a first longitudinal segment, for example at an upstream longitudinal segment, having a narrower extent or diameter and a second multitude of second passages can connect to the cylindrical section at a second longitudinal segment, for example at a downstream longitudinal segment, having a wider extent or diameter. This results in material portions that are guided by the first multitude of second passages being fed to the outlet section at a radially inner position and in material portions guided by the second multitude of second passages being fed to the outlet section at a radially outward position. Each of the multitudes of second passages comprises at least one second passage.

According to an embodiment, the second passage comprises two, three or more inlets, wherein each of the inlets is connected to at least one of the first passages. The material portions that are fed to the second passage from the individual inlets can subsequently be mixed during propagation through the second passage. The individual inlets of the second passage can be located at any radial position between the longitudinal axis and a radially outer end of the second passage, for example at varying radial positions. The inlets can connect to the second passage parallel to the longitudinal axis so that the inlets connect to a top surface of the second passage that is orientated perpendicular to the longitudinal axis.

According to an embodiment, the inlets are located at a radially outer part of the second passage. This maximizes the propagation length in the second passage and thus improves mixing within the second passage. For example, all inlets can be located at a radially outer part of the second passage, for example at a radially outer end of the second passage. According to an embodiment, the second passage is centered around the longitudinal axis and has a cylindrical shape, for example a tapered cylindrical shape. Such a second passage can have inlets that are distributed around the longitudinal axis in a radially outer part of the second passage and it can merge individual material portions entering through the inlets upon inward propagation towards the longitudinal axis. The second passage can be tapered so that the diameter of the second passage decreases along the longitudinal axis in a downstream direction from the inlet section towards the outlet section. Such a taper leads to a homogeneous mixture of the material portions entering the second passage at its radially outer part.

According to an embodiment, the mixing segment has at least two second passages being arranged radially with respect to the longitudinal axis, wherein a first of the second passages is connected to a first longitudinal segment of the outlet section and a second of the second passages is connected to a second longitudinal segment of the outlet section. Thereby, the second longitudinal segment is located from the first longitudinal segment in a downstream direction along the longitudinal axis.

If the outlet section first receives material from at least the first of the second passages and only then receives material from at least the second of the second passages, the material from the second of the second passages can be deposited circumferentially around the material from the first of the first passages. For example, the outlet section can have a smaller extent or diameter perpendicular to the longitudinal axis in the first longitudinal segment than in the second longitudinal segment. It then can have a transition, for example a step-wise transition, from the smaller extent or diameter to the larger extent or diameter longitudinally in between the first and second segment. The transition can, for example, be located at the beginning of the second segment. The first and second segment can, for example, directly adjoin each other along the longitudinal axis at the location of the transition.

According to a further embodiment, the mixing segment has a first plurality of second passages being arranged radially and being connected to the first segment of the outlet section, and a second plurality of second passages being arranged radially and being connected to the second segment of the outlet section.

This enables homogeneous distribution of the material entering the outlet section in the first and second segment, respectively. For example, the individual second passages of the first plurality can be pairwise arranged opposite to each other with respect to the longitudinal axis and the individual second passages of the second plurality can also be pairwise arranged opposite to each other with respect to the longitudinal axis so that the material uniformly enters the first and second segments from radially opposite sides.

According to an embodiment, the passages of the first plurality of second passages and the passages of the second plurality of second passages are alternately located circumferentially around the longitudinal axis. This further improves homogeneity of the resulting mixture as both the second passages of the first plurality and the second passages of the second plurality are evenly distributed around the longitudinal axis.

According to an embodiment, the first passages that are connected to one of the second passages are adjoined to the inlet section above each other along the longitudinal axis. For example, all first passages that are connected to the same second passage can be adjoined to the inlet section above each other along the longitudinal axis. The individual first passages that are connected to the same second passage thus consecutively receive radially stacked material portions from the inlet section. These material portions can then be distributed circumferentially around the longitudinal axis at the beginning of the second passage by connecting the first passages to the second passage via inlets that are circumferentially distributed around the longitudinal axis. Mixing within the mixing segment then at least partially results from converting radially stacked material portions to circumferentially distributed material portions. If the mixing segment comprises more than one second passage, for example the first and second plurality of second passages, all first passages that are in fluid connection with the same second passage can be adjoined to the inlet section above each other along the longitudinal axis.

For example, between two and four first passages, such as three first passages, can be connected to one of the second passages. In particular, between two and four first passages, such as three first passages, can be connected to each of the second passages. In this way the walls of the respective first passages are not formed too thin, so that they can no longer withhold the pressures present in the first passages when a component is passed through the passage. Furthermore, connecting between two and four first passages, such as three first passages, to the same second passage allows keeping the dimensions of the passages within usual manufacturing limits.

According to an embodiment, the mixing segment comprises a plurality of longitudinal passages, each longitudinal passage being arranged in parallel with respect to the longitudinal axis and connecting one or more of the first passages with the second passage. Such longitudinal passages can be part of the individual flow paths from the inlet section via the first passages and the at least one second passage to of the outlet section. Within the longitudinal passages, individual material portions that are taken at different positions from the inlet section can be held separated prior to mixing them in the at least one second passage of the mixing element. Each longitudinal passage can be longitudinally located between one of the first passages and the corresponding second passage.

According to a further embodiment, the longitudinal passages are arranged circumferentially around the longitudinal axis in an annular peripheral portion of the mixing segment surrounding the longitudinal axis. This enables the mixing segment to have compact dimensions along the longitudinal axis, as well as in the radial plane perpendicular to the longitudinal axis.

According to an embodiment, the longitudinal passages are configured as separate tubes. Such tubes allow a lightweight, yet sturdy construction of the mixing segment. The separate tubes can have, for example, free-standing walls that are separate from each other. Alternatively, neighboring tubes can share a single wall in between them with the individual tubes being delimited by opposite surfaces of the single wall.

According to an embodiment, two or more first passages are adjoined to one longitudinal passage. Therefore, material portions propagating through the individual first passages can already become at least partly mixed within the longitudinal passage. If the mixing segment is configured as a first mixing segment of the static mixer that receives the individual components of the material still unmixed, the individual first passages that are connected to the same longitudinal passage can each conduct different material components of the multi-component material.

According to an embodiment, the inlet section is arranged in a central portion of the mixing segment, wherein the inlet section comprises a longitudinal cylindrical section, and wherein the first passages are radially connected to the cylindrical section. Such a mixing segment has compact dimensions both longitudinally and radially. Like the outlet section, the inlet section can have a circular or polygonal cross-sectional shape. Furthermore, the inlet section can have a cross-sectional diameter or extent that varies along the longitudinal axis. This variation can be continuous or stepwise. The cross-sectional diameter or extent at a downstream end of the outlet section can match the corresponding diameter or extent at an upstream end of the inlet section so that several mixing segments can seamlessly adjoin each other along the longitudinal axis.

According to an embodiment, the first passages are configured as separate tubes. Like with the longitudinal passages, such tubes allow a lightweight and sturdy construction of the mixing segment. The walls of the individual tubes can be configured as it is described in connection with the tubes forming the longitudinal passages.

According to an embodiment, the mixing segment has two, three or more tiers of first passages arranged along the longitudinal axis. This allows a definition of flow paths that receive material portions from the inlet section that are radially stacked with respect to the longitudinal axis. For example, the flow paths defined by a first, most upstream tire of first passages receive material portions from the radially outermost part of the inlet section and the consecutive, more downstream tiers of first passages successively receive material portions from more inward parts of the inlet section. The first passages can be located within the individual tiers at the same circumferentially positions so that the first passages of the individual tiers are longitudinally aligned with each other.

According to an embodiment, the first passages of a first tier and the first passages of a second tier are pairwise connected to the inlet section above one another along the longitudinal axis. For example, the first passages can be located in all individual tiers at the same circumferential positions so that the first passages of all individual tiers are longitudinally aligned with each other. Thus, radially stacked material portions within the inlet section get distributed over the individual longitudinally aligned first passages of the individual tiers while propagating along the longitudinal axis.

According to an embodiment, the inlet section comprises several radial outlets, each radial outlet being connected to two first passages. At each radial outlet, the material exiting the inlet section is thus split into two first passages. These two first passages can, for example, be connected to two separate second passages, for example to two separate neighboring second passages that radially adjoin consecutive longitudinal segments of the outlet section.

According to an embodiment, a first passage connected to one radial outlet and a first passage connected to a neighboring radial outlet are both connected to the second passage via a common inlet of the second passage. The material portions propagating via the individual neighboring radial outlets can therefore already mix before entering the second passage via the common inlet, for example before or while entering a common longitudinal passage that is connected to the common inlet. If the mixing segment is a first mixing segment receiving the yet unmixed material components, each radial outlet can receive one of the individual components and the components can become at least partly mixed upon propagation to the common inlet of the second passage.

The present disclosure is also directed at a further mixing segment for a static mixer, having one inlet section, one outlet section disposed opposite of the inlet section, a longitudinal axis being defined between the inlet section and the outlet section, a radial mixing chamber having two or more separate inlets for receiving two or more components of a multi-component material and al least one outlet for outputting a mixture of the at least two components. The inlets are positioned with respect to the longitudinal axis at a radially outer portion of the radial mixing chamber and the outlet is positioned with respect to the longitudinal axis at a radially inner portion of the radial mixing chamber. Preferably, the outlet is arranged coaxial to the longitudinal axis. Additionally, the individual inlets are connected to separate mixing passages that are in fluid connection with the inlet section.

The mixing chamber of this further mixing segment can be configured as it is disclosed in connection with the second passage of the above-described mixing segment according to the present disclosure. Additionally, the separate mixing passages can be configured as it is disclosed in connection with the flow paths of the mixing segment described above. Furthermore, all other components and aspects of the further mixing segment can be configured as it is disclosed in connection with the mixing segment described above. Consequently, all embodiments and technical effects that are disclosed in connection with the mixing segment described above, also apply to the further mixing segment and vice versa.

The present disclosure is further directed to a static mixer having one or more mixing segments in accordance with the present disclosure. Furthermore, the static mixer can have an inlet portion with two or more inlets that are configured to guide a respective multi-component material to the inlet section of a first mixing segment. Each of the two or more inlets can receive a separate component of the multi-component material. The first mixing segment can receive the yet unmixed components of the multi-component material. Further mixing segments of the static mixer that are sequentially connected to each other along the longitudinal axis after the first mixing segment can then receive the individual components in an at least partially mixed state.

According to an embodiment, the mixer has at least two mixing segments according to the present disclosure, wherein a further type of mixing segment is arranged between the two mixing segments. This further type of mixing segment mixes the multi-component material in a different way than the mixing segments according to the present disclosure and therefore can equal out residual inhomogeneities that remain at the outlet of the mixing segments according to the present disclosure. The further type of mixing segment can be configured as a helical mixing segment.

According to an embodiment, the further type of mixing segment has a longitudinal tubular section with a helical inner wall. Such a mixing segment constitutes a helical mixing segment. Helical mixing segments efficiently mix upon propagation in the longitudinal direction and thus complement the radial mixing segments according to the present disclosure.

The static mixer can comprise between two and five, such as four, mixing segments according to the present disclosure. Additionally or alternatively, the static mixer can comprise between two and five, such as four, mixing segments of the further type. For example, the static mixer can comprise for mixing segments according to the present disclosure and for mixing segments of the further type.

According to an embodiment of the mixer, the inlet portion is configured to guide a first component of the multicomponent material to at least one first radial outlet of the inlet section of the first mixing segment and a second component of the multicomponent to at least one second radial outlet of the inlet section of the first mixing segment. The First and second component can then become mixed with each other in a well-defined fashion via individual flow paths that start at the first and second outlet and join before reaching the outlet section. The first and second radial outlet can be positioned next to each other along a circumferential direction around the longitudinal axis of the first mixing segment.

According to an embodiment, the inlet portion is configured to guide the first component of the multicomponent material to a plurality of first radial outlets of the inlet section and the second component of the multicomponent material to a plurality of second radial outlets of the inlet section, wherein the first radial outlets and the second radial outlets are alternately located next to each other. This allows mixing the first and second component received via neighboring outlets in a simple way. Furthermore, passages that connect the individual outlets of the inlet section to the second passage can have a short length.

According to an embodiment, the inlet portion has a double-walled longitudinal section that guides the first component of the multicomponent material via a center tubular chamber to the at least one first radial outlet and the second component of the multicomponent material via an annular outer chamber surrounding the center tubular chamber to the at least one second radial outlet. This leads to an even distribution of both the first and second component along the circumferential direction around the longitudinal axis. The annular outer chamber can be a single chamber surrounding the longitudinal axis or it can comprise several annular segments that are distributed around the longitudinal axis and circumferentially spaced apart from each other.

According to an embodiment, the static mixer has two or more mixing segments according to the present disclosure, wherein the outlet section of one of the two or more mixing segments is adjoined to the inlet section of a neighboring mixing segment by a single tubular channel guiding a mixture of the first and second component. Such a single tubular channel can efficiently guide material between the individual mixing segments by offering only a small flow resistance to the material.

According to an embodiment, the mixer has two mixing segments according to the present disclosure, wherein the mixing segments directly adjoin one another without any further mixing elements in between. Thus, the mixer mixes the multi-component material only within the individual mixing segments according to the present disclosure and not during its passage between the individual mixing segments.

According to an embodiment, the mixing segments of the static mixer are rotated with respect to one another around the longitudinal axis. Thus, the positions of the radial outlets of the inlet sections of the individual mixing segments and the individual first passages of consecutive mixing segments are rotated with respect to each other. Therefore, the individual first passages of consecutive mixing segments receive the mixing material from varying circumferential positions around the longitudinal axis.

According to an alternative embodiment, the mixing segments are aligned parallel with each other. This results in the radial outlets of the inlet sections of all mixing segments and the individual first passages of consecutive mixing segments being aligned with each other and in the first passages of the inlet sections of all mixing segments receiving the mixing material at the same circumferential position. As it has been found, that this alignment of all mixing segments parallel to each other further improves the homogeneity of the resulting mixture compared to mixing segments that are not aligned with each other.

In yet another aspect, the present disclosure is directed at a method for manufacturing a mixing segment according to the present disclosure, wherein the mixing segment is formed by sequentially placing material layers forming the mixing segment in crossectional planes perpendicular to the longitudinal axis of the mixing segment. The mixing segment is thus fabricated by additive manufacturing in cross-sectional planes that are orientated perpendicular to the longitudinal axis. Additive manufacturing can include material extrusion, material jetting, powder bed fusion, vat photopolymerization, or the like.

For example, the mixing segment can be additively manufactured from a liquid resin, such as a liquid polymer, for example a liquid photopolymer. Mixing segments manufactured from liquid resins can be easily cleaned after manufacturing from non-reacted raw material. Furthermore, liquid-resin-based manufacturing permits the formation of filigree components.

BRIEF DESCRIPTION OF THE DRAWINGS

Embodiments of the disclosure will be explained in more detail with reference to the drawings.

DETAILED DESCRIPTION

Figure 1:
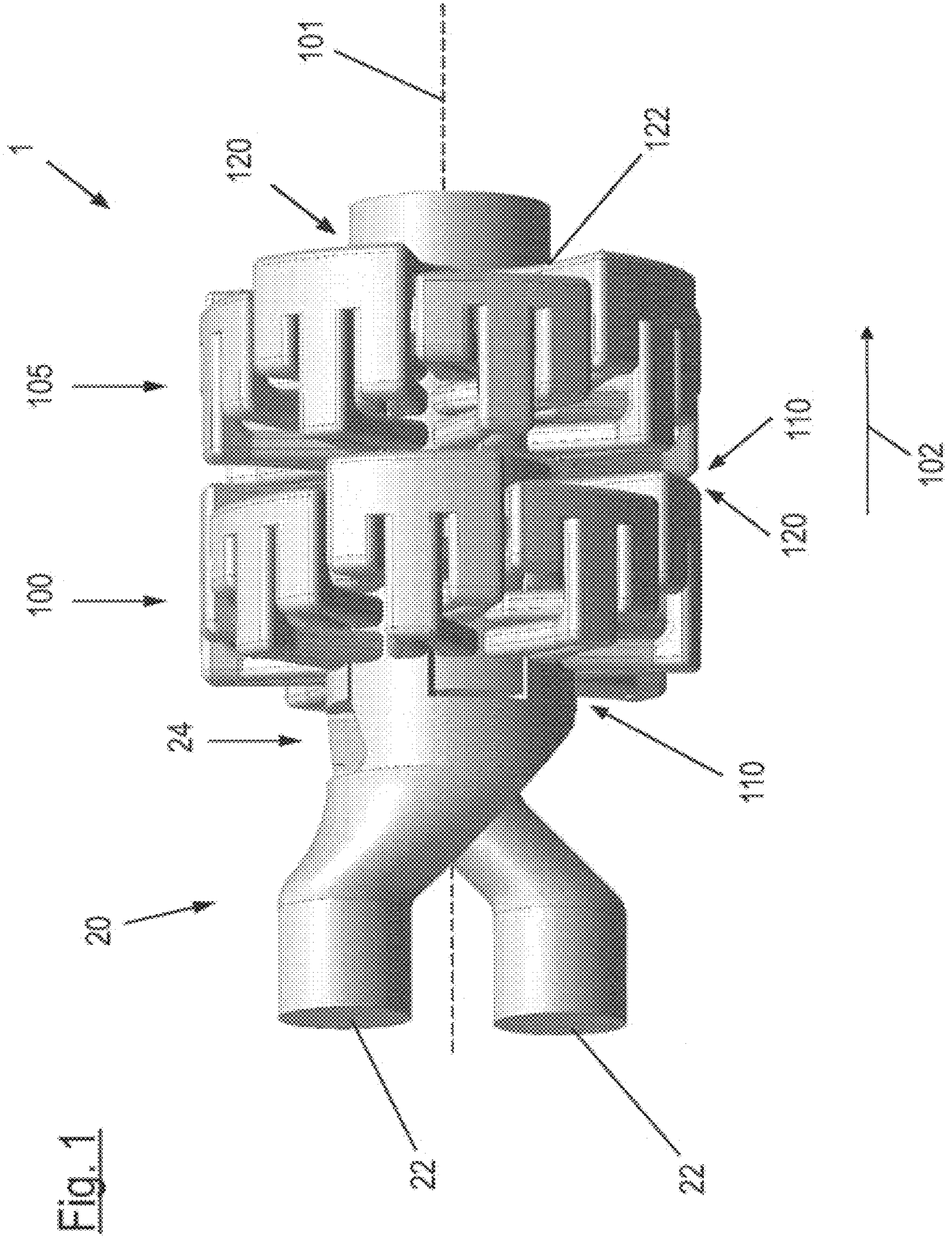
FIG. 1 is a first static mixer having an inlet portion and two mixing segments according to the present disclosure.

FIG. 1 depicts a first static mixer 1 having an inlet portion 20 and two mixing segments 100, 105 according to a first embodiment of the present disclosure. The inlet portion 20, a first mixing segment 100 and a second mixing segment 105 consecutively adjoin each other in a downstream direction 102 along a longitudinal axis 101, wherein the downstream direction 102 is directed from the inlet portion 20 to the second mixing segment 105.

Each mixing segment 100, 105 has an inlet section 110 and an outlet section 120, wherein the inlet section 110 and the outlet section 120 of each individual mixing segment 100, 105 are placed opposite to each other along the longitudinal axis 101. Along the downstream direction 102, the inlet portion 20 adjoins the inlet section 110 of the first mixing segment 100 and the outlet section 120 of the first mixing segment 100 adjoins the inlet section 110 of the second mixing segment 105. Although not shown in FIG. 1, the static mixer 1 can comprise further mixing segments 100 that follow the second mixing segment 105 and adjoin each other in the downstream direction 102 along the longitudinal axis 101.

The inlet portion 20 has two separate inlets 22, wherein each inlet 22 receives one component of a two-component material to be mixed in the mixing segments 100, 105. The inlets 22 guide the individual material components to a longitudinal section 24 of the inlet portion 20 and the longitudinal section 24 discharges into the inlet portion 110 of the first mixing segment 100.

Figure 2:
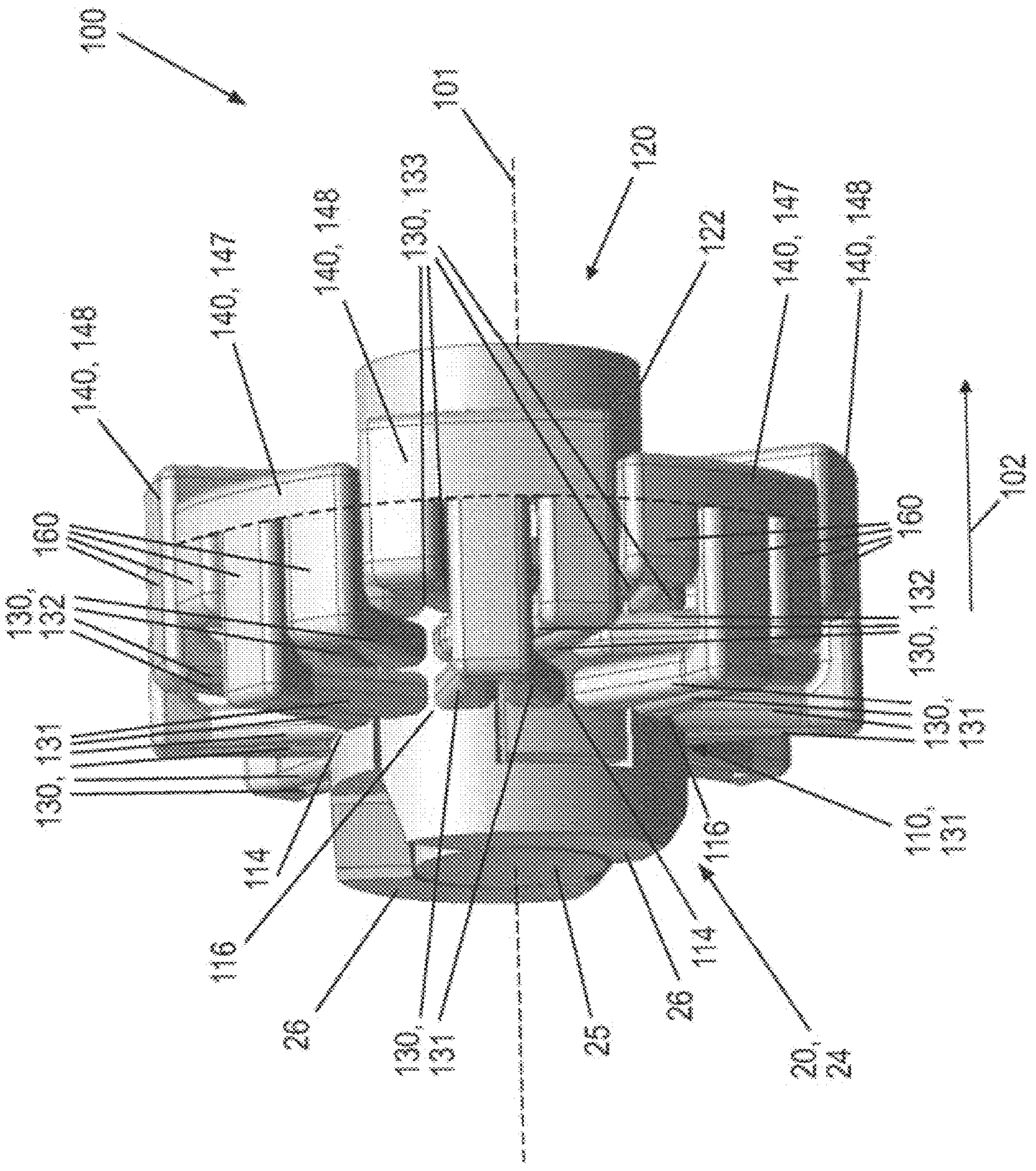
FIG. 2 is a longitudinal section of the inlet portion and an adjoining first mixing segment.

FIG. 2 schematically shows the longitudinal section 24 of the inlet portion 20 and the adjoining first mixing segment 100. The longitudinal section 24 has a center tubular chamber 25 that guides a first component of the two-component material to the inlet section 110 of the first mixing segment 100 and an annular outer chamber 26 that guides a second component of the two-component material to the inlet section 110. The annular outer chamber 26 is divided into two annual segments that are radially located opposite to each other.

The inlet section 110 of the first mixing segment 100 has a cylindrical section 113 with a generally cylindrical outer shape. The cylindrical section 113 has a plurality of first radial outlets 114 and a plurality of second radial outlets 116. Each first and second radial outlet 114, 116 connects to two radially arranged first passages 130 of the first mixing segment 100. Along the longitudinal axis 101, the first passages 130 and the first and second radial outlets 114, 116 are arranged in the downstream direction 102 within a first tier 131, a second tier 132 and a third tier 133. Within the individual tiers 131, 132, 133, the first and second radial outlets 114, 116 and the first passages 130 are circumferentially distributed around the longitudinal axis 101. Furthermore, the first and second radial outlets 114, 116 are alternately located next to each other in a circumferential direction around the longitudinal axis 101 within each individual tier 131, 132, 133.

Along the longitudinal axis 101, the first and second radial outlets 114, 116 of the individual tiers 131, 132, 133 are longitudinally aligned with each other so that the first radial outlets 114 and the second radial outlets 116 are positioned at the same circumferential positions within each tier 131, 132, 133. With the first mixing segment 100 shown in FIG. 2, the first radial outlets 114 are in fluid connection with the center tubular chamber 25 of the inlet portion 20 that guides the first material component and the second radial outlets 116 are in fluid connection with the annular outer chamber 26 of the inlet portion 20 that guides the second material component.

Within each tier 131, 132, 133, the first passages 130 are grouped into individual pairs of neighboring first passages 130. Among the individual pairs, one first passage 130 is connected at its radially inner end to one of the first radial outlets 114 and the other first passage 130 is connected at its radially inner end to a neighboring second radial outlet 116. At their radially outer ends, the first passages 130 of each pair connect to a common longitudinal passage 160. The first passages 130, as well as the longitudinal passages 160 are configured as separate tubes, whereby the first passages 130 run radially with respect to the longitudinal axis 101 and the longitudinal passages 160 run parallel to the longitudinal axis 101.

The mixing segment 100 further has a multitude of radially arranged second passages 140, which are grouped in a first plurality 147 and a second plurality 148 of second passages 140. Each second passage 140 connects at its radially outer end to three longitudinal passages 160 and at its radially inner end to a cylindrical section 122 of the outlet section 120 of the first mixing segment 100. Along the longitudinal axis 101, a first plurality 147 of the second passages 140 is connected to a first longitudinal segment of the cylindrical section 122 of the outlet section 120 and a second plurality 148 of the second passages 140 is connected to a second longitudinal segment of the cylindrical section 122, whereby the second longitudinal segment is located from the first longitudinal segment in the downstream direction 102. The second passages 140 are circumferentially distributed around the longitudinal axis 101 and the second passages 140 of the first and second plurality 147, 148 are alternately located next to each other around the longitudinal axis 101.

The longitudinal passages 160 that are connected to the same second passage 140 are connected to first passages 130 that are located in separate tiers 131, 132, 133. Thereby, each individual second passage 140 is in fluid connection with one of the first radial outlets 114 from each tier 131, 132, 133, the first radial outlets 114 being longitudinally aligned with each other, and to one neighboring second radial outlet 116 from each tier 131, 132, 133, the second radial outlets 116 being also longitudinally aligned with each other. Therefore, all first passages 130 of the individual tiers 131, 132, 133, that are longitudinally aligned with each other at the inlet section 110 are in fluid connection with the same second passage 140.

In total, the individual first and second outlets 114, 116 and the individual first passages 130 define individual flow paths from the inlet section 110 to the outlet section 120 of the mixing segment 100 that run via the first passages 130, the longitudinal passages 160 and the second passages 140. Within each tier 131, 132, 133, each of the individual radial outlets 114, 116 connects to two neighboring first passages 130, whereby, for each radial outlet 114, 116, one of the connected first passages 130 is in fluid connection with a second passage 140 from the first plurality 147 of second passages 140 and the other one of the connected first passages 130 is in fluid connection with a second passage 140 from the second plurality 148 of second passages 140.

Furthermore, all first passages 130 of the individual tiers 131, 132, 133, that are longitudinally aligned with each other at the inlet section 110 are in fluid connection with the same second passage 140. Thereby, circumferentially neighboring pairs of first passages 130 that are positioned next to each other within the individual tiers 131, 132, 133 and that are connected to separate neighboring radial outlets 114, 116 of the inlet section 110 are connected to the same second passage 140 via a common longitudinal passage 160 and join at the upstream end of their respective longitudinal passage 160.

In total, each individual second passage 140 therefore is in fluid connection with one pair of first passages 130 from every tier 131, 132, 133, whereby the individual pairs from the different tiers 131, 132, 133 are longitudinally aligned with each other. Within each tier 131, 132, 133, the first passages 130 that are in fluid connection with the same second passage 140 separately connect to neighboring first and second radial outlets 114, 116 of the inlet section 110.

Figure 3:
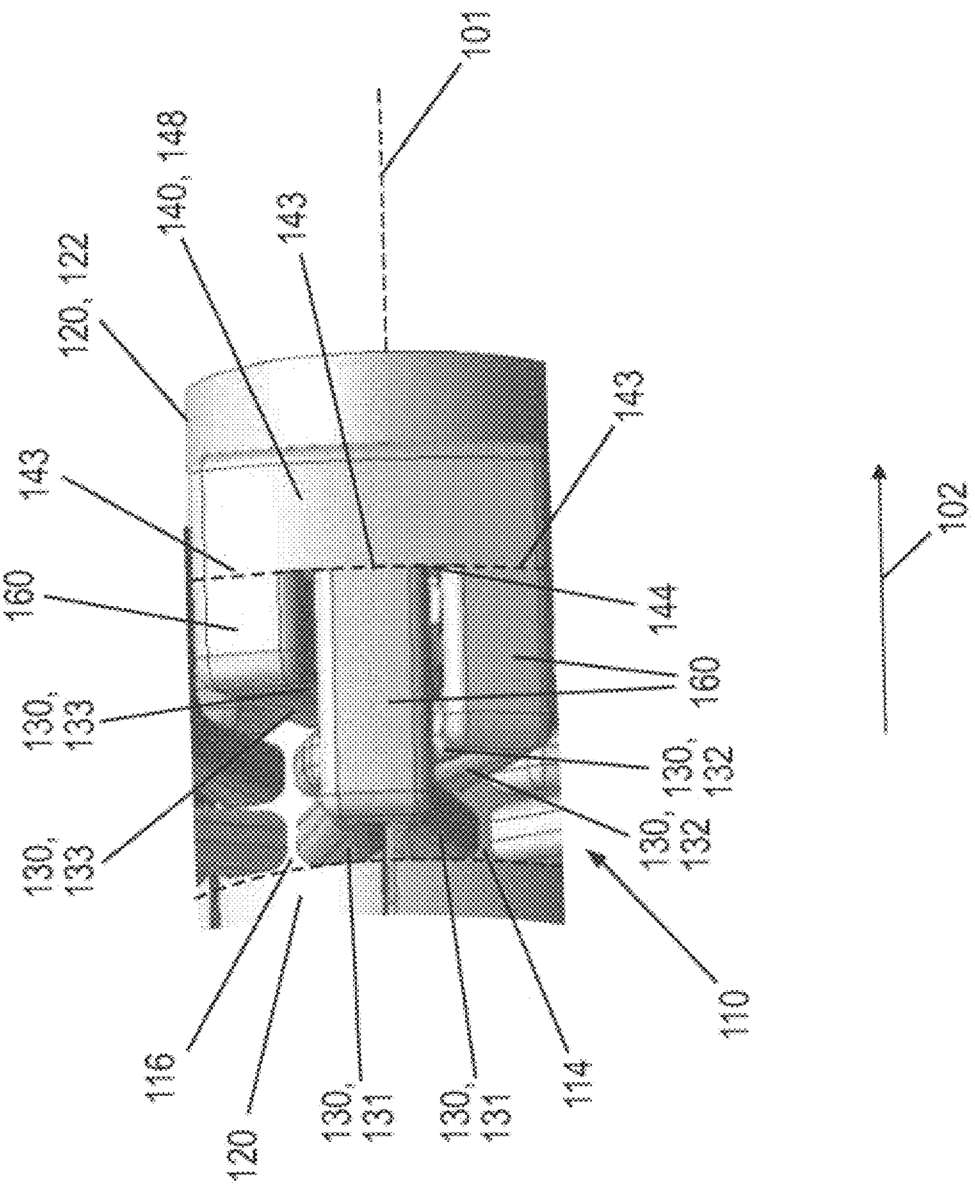
FIG. 3 is a detailed view of a second passage of the first mixing segment.

FIG. 3 shows a more detailed view of one of the second passages 140 from the second plurality 148 and its connection to the inlet section 110. The second passage 140 has three inlets 143 at its radially outer end, whereby the inlets 143 are positioned at a top surface 144 of the second passage 140. Each inlet 143 is connected to a separate longitudinal passage 160, which in turn is connected at its upstream end to two first passages 130. Therefore, the individual inlets 143 form common inlets that are in fluid connection with two first passages 130.

Figure 4A:
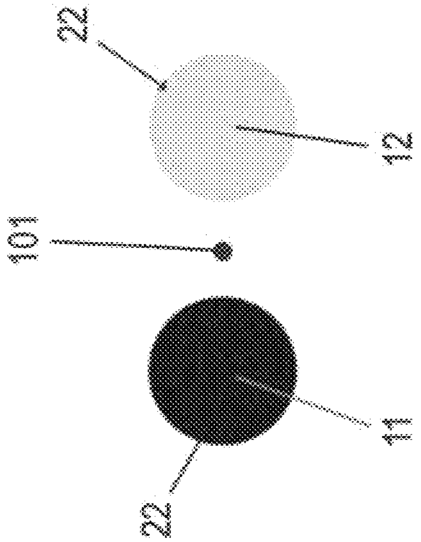
FIG. 4 cross-sectional cuts through the inlet portion of the first static mixer perpendicular to a longitudinal axis.
Figure 4B:
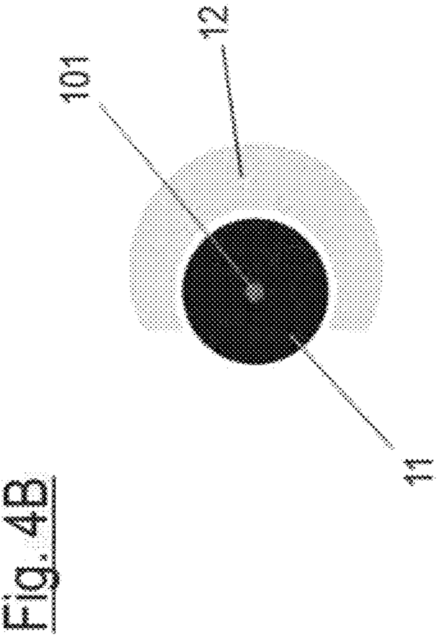
Figure 4C:
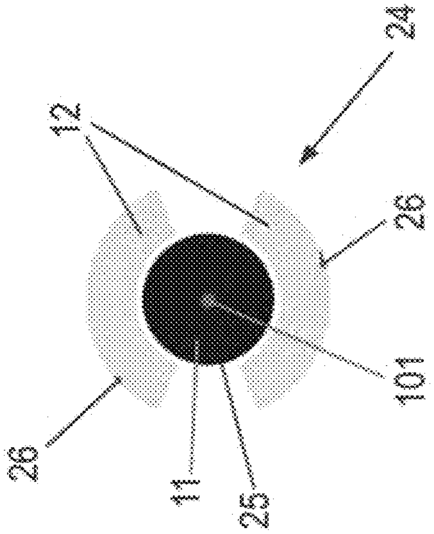
Figure 4D:
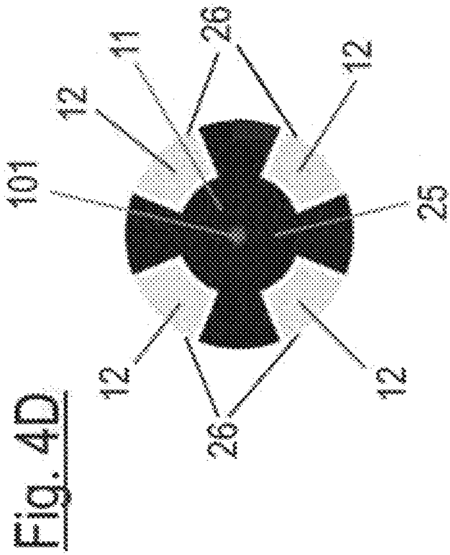

FIGS. 4A to 4D schematically show cross-sectional cuts through the inlet portion 20 of the first static mixer 1 in cross-sectional planes perpendicular to the longitudinal axis 101. At the beginning of the inlet portion 20, shown in FIG. 4A, the inlets 22 are radially placed next to each other and separately receive a first component 11 and a second component 12 of the two-component material. As can be seen from FIG. 4B, which shows a cross-sectional cut at a more downstream position along the longitudinal axis 101, the inlet portion 20 guides the second component 12 circumferentially around the first component 11. At an even more downstream position, which is shown in FIG. 4C, the inlet portion 20 has a double-walled longitudinal section 24 with a center tubular chamber 25 that guides the first component 11 and an annular outer chamber 26 that guides the second component 12. Thereby, the annular outer chamber 26 is split in two annular segments that are circumferentially positioned opposite to each other. Towards the end of the inlet portion 20, each of the two segments of the outer chamber 26 is again split into two parts and the center tubular chamber 25 radially extends through the gaps between the individual segments of the outer annular chamber 26 up to the outer shell of inlet portion 20, as it is shown in FIG. 4D.

Figure 5:
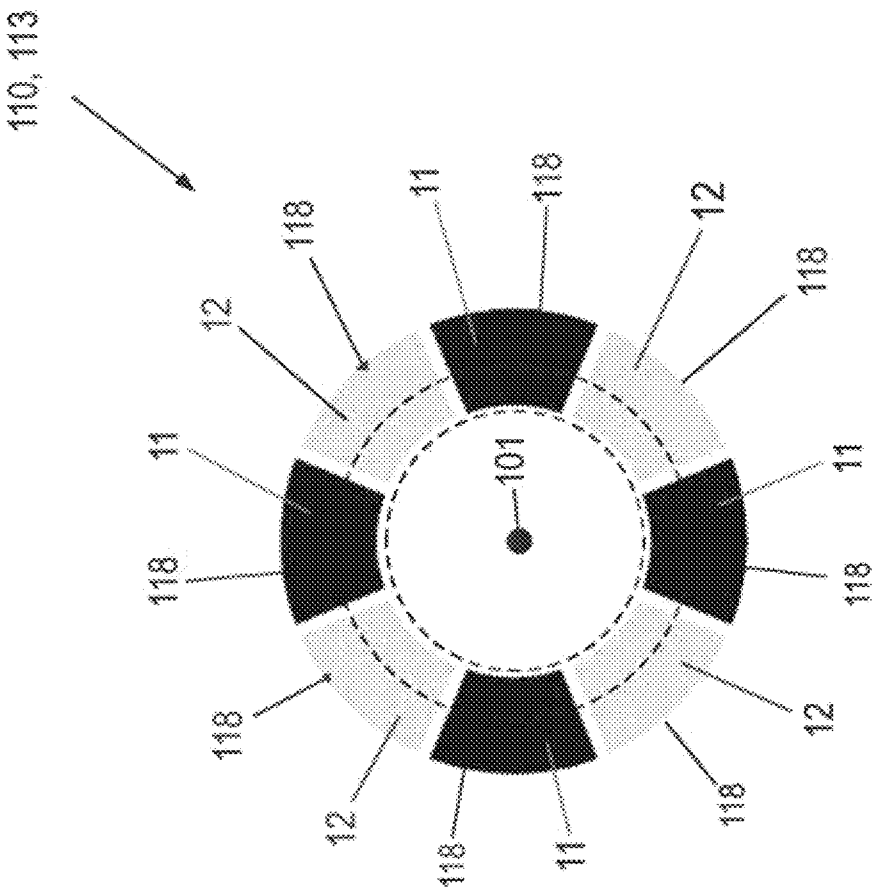
FIG. 5 is an upstream end of the cylindrical section of an inlet section of the first mixing segment in a cross-sectional view perpendicular to the longitudinal axis.

FIG. 5 shows the upstream end of the cylindrical section 113 of the inlet section 110 of the first mixing segment 100 in a cross-sectional view perpendicular to the longitudinal axis 101. The first material component 11 has been pushed completely into an annular region around the longitudinal axis 101. Within the annular outer region at the beginning of the inlet section 110, the cylindrical section 113 has circumferentially distributed annular outer segments 118 that alternately contain the first and second material component 11, 12.

Figure 6:
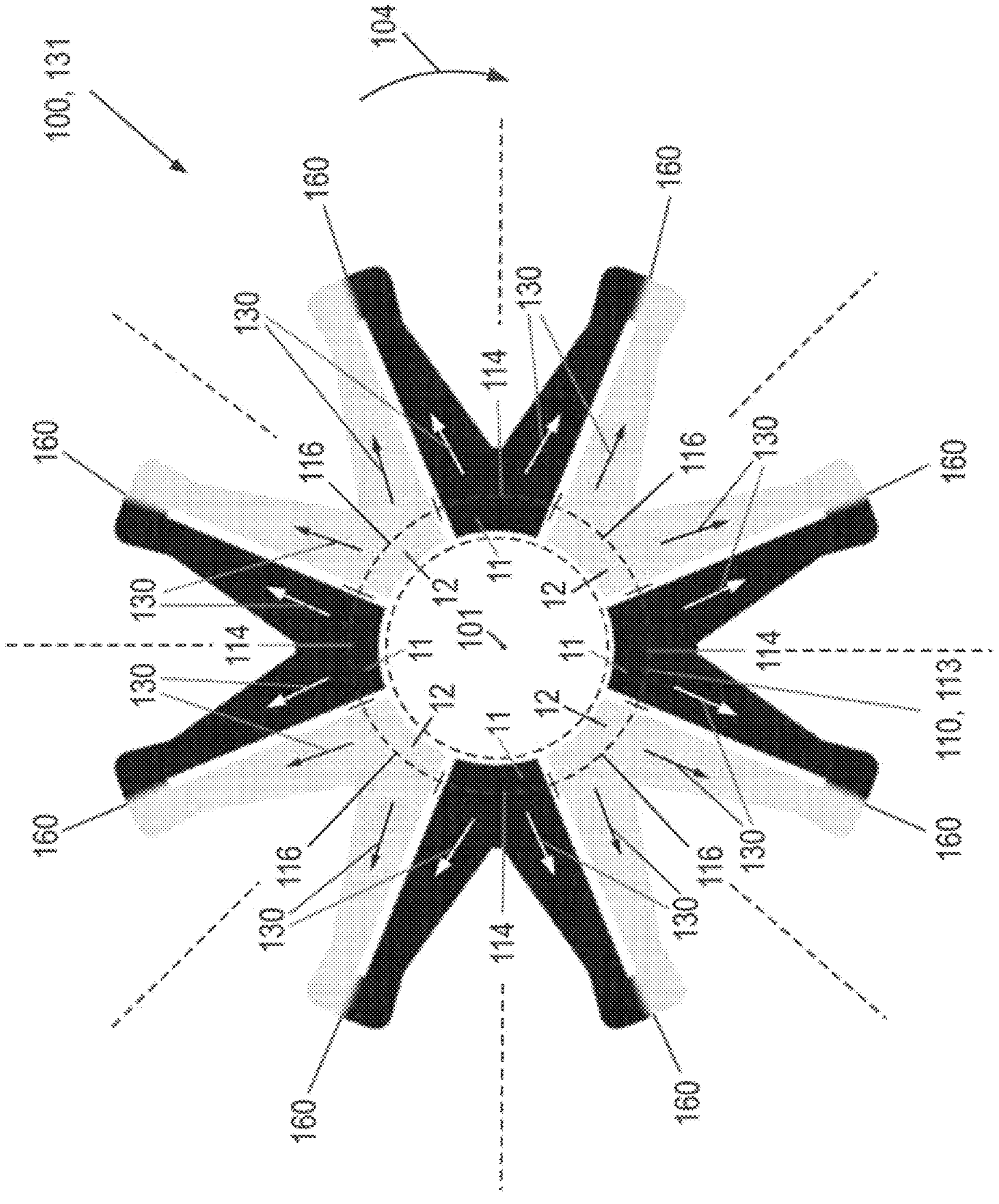
FIG. 6 is the first mixing segment in a cross-sectional cut perpendicular to the longitudinal axis and through a first tier of first passages.
Figure 7:
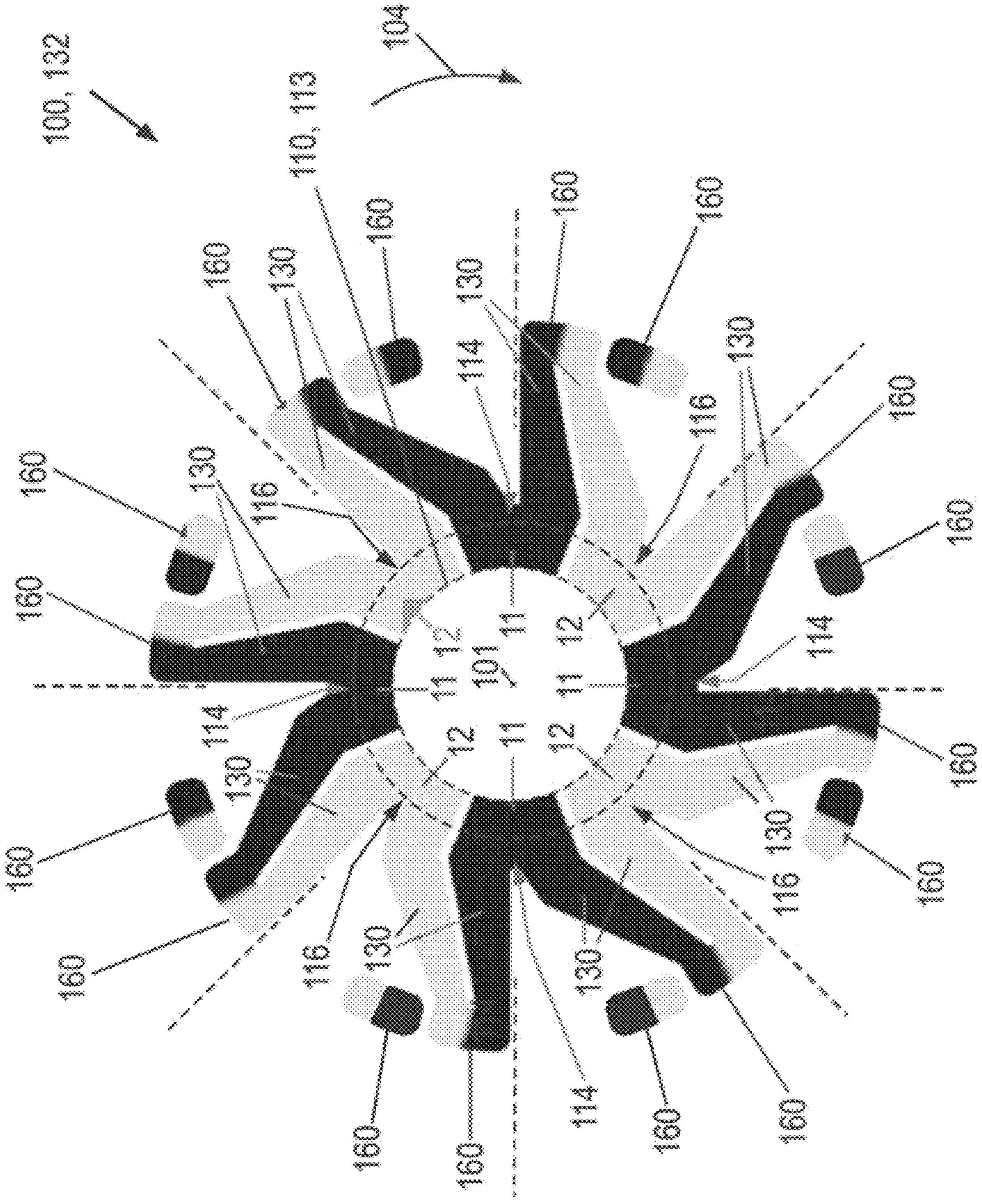
FIG. 7 is the first mixing segment in a cross-sectional cut perpendicular to the longitudinal axis and through a second tier of first passages.
Figure 8:
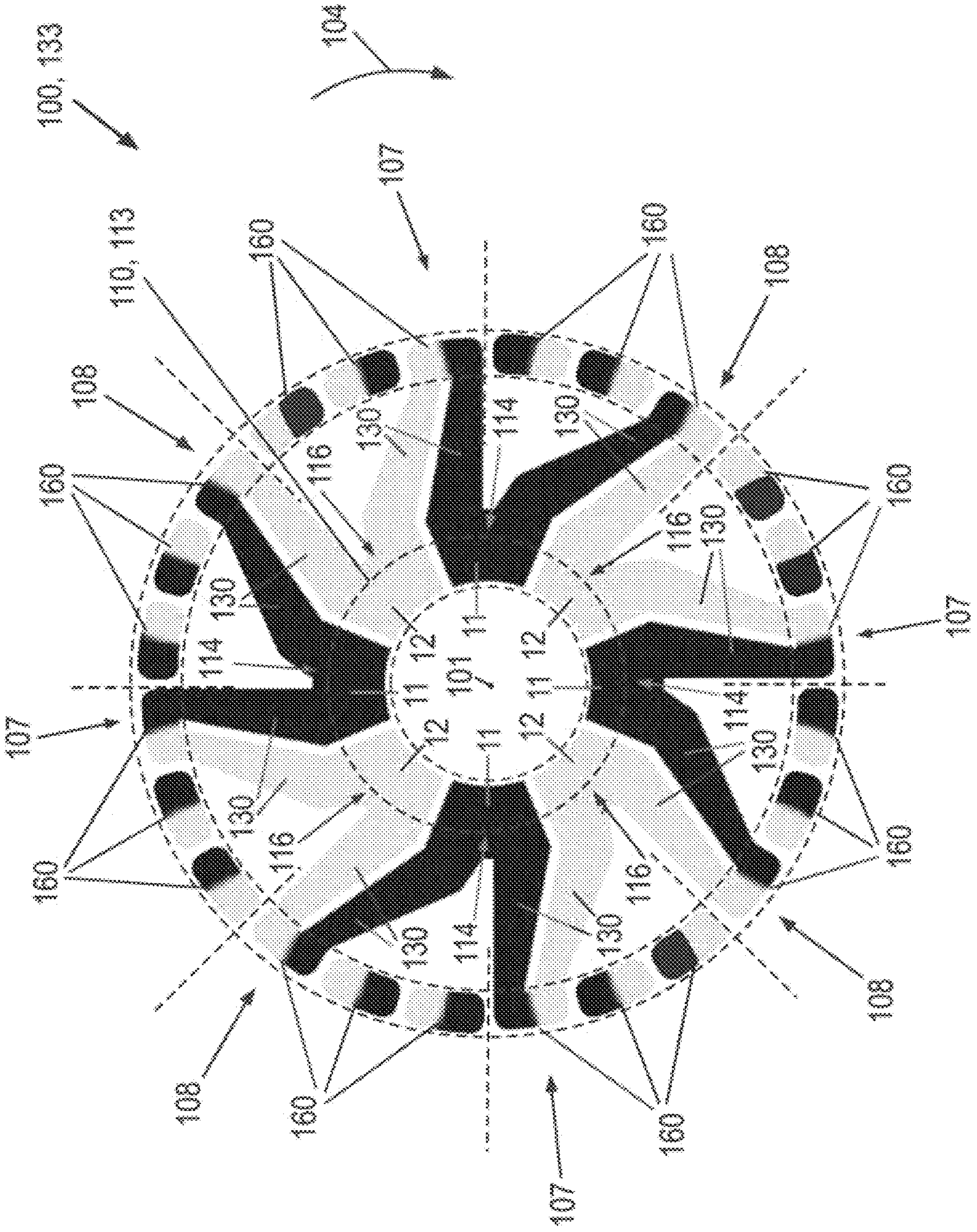
FIG. 8 is the first mixing segment in a cross-sectional cut perpendicular to the longitudinal axis and through a third tier of first passages.

FIG. 6 shows the first mixing segment 100 in a cross-sectional cut perpendicular to the longitudinal axis 101 and through the first tier 131 of first passages 130. Likewise, FIGS. 7 and 8 show the first mixing segment 100 in cross-sectional cuts perpendicular to the longitudinal axis 101 through the second and third tier 132, 133, respectively. Within each tier 131, 132, 133, the first material component 11 discharges through the plurality of first radial outlets 114 and the second material component 12 discharges through the plurality of second radial outlets 116 into the individual first passages 130. At their radially outer ends, pairs of neighboring first passages 130 that are connected to separate neighboring outlets 114, 116 within each tier 131, 132, 133 connect to the same longitudinal passage 160.

The first passages 130 within the individual tiers 131, 132, 133 that connect at the same circumferential position to longitudinally aligned first and second radial outlets 114, 116 discharge at their radially outer ends into longitudinal passages 160 that are directly placed next to each other in a circumferential direction 104 around the longitudinal axis 101. Thereby, the longitudinal passages 160 that are connected via the first passages 130 to longitudinally aligned radial outlets 114, 116 within the second and third tier 132, 133 are located in the circumferential direction 104 on both sides of the longitudinal passage 160 that connects to the respective longitudinally aligned radial outlet 114, 115 within the first tier 131.

As can be seen from FIG. 8, the longitudinal passages 160 are arranged parallel to each other in an annular peripheral portion 106 of the mixing segment 100. The annular peripheral portion 106 comprises a multitude of first segments 107 and a multitude of second segments 108, wherein the first and second segments 107, 108 are alternately located next to each other along the circumferential direction 104. The individual first and second segments 107, 108 each contain all longitudinal passages 160 that are in fluid connection with longitudinally aligned pairs of neighboring first and second radial outlets 114, 116.

Figure 9:
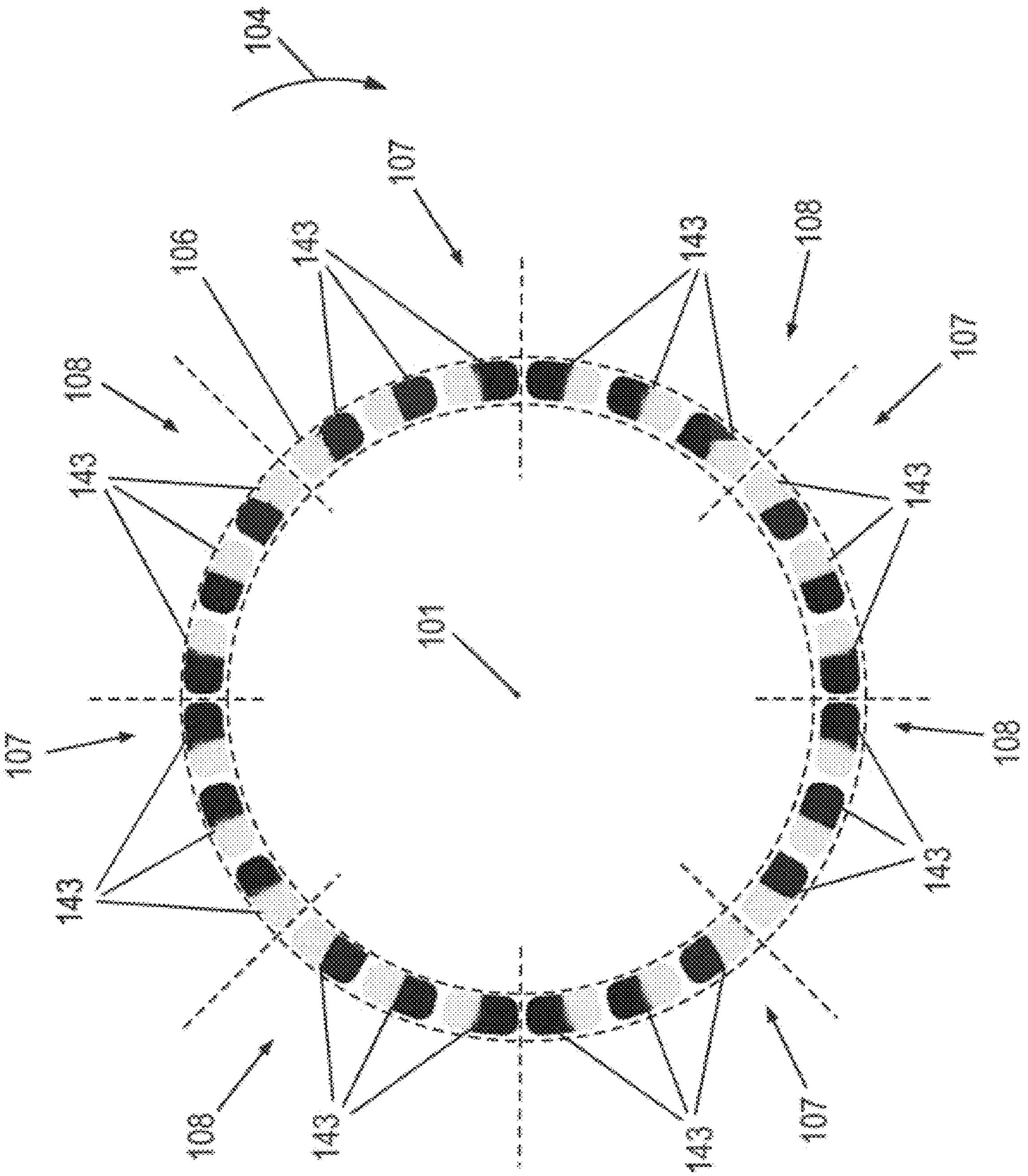
FIG. 9 is a cross-sectional cut perpendicular to the longitudinal axis through inlets of second passages of the first mixing segment.
Figure 10:
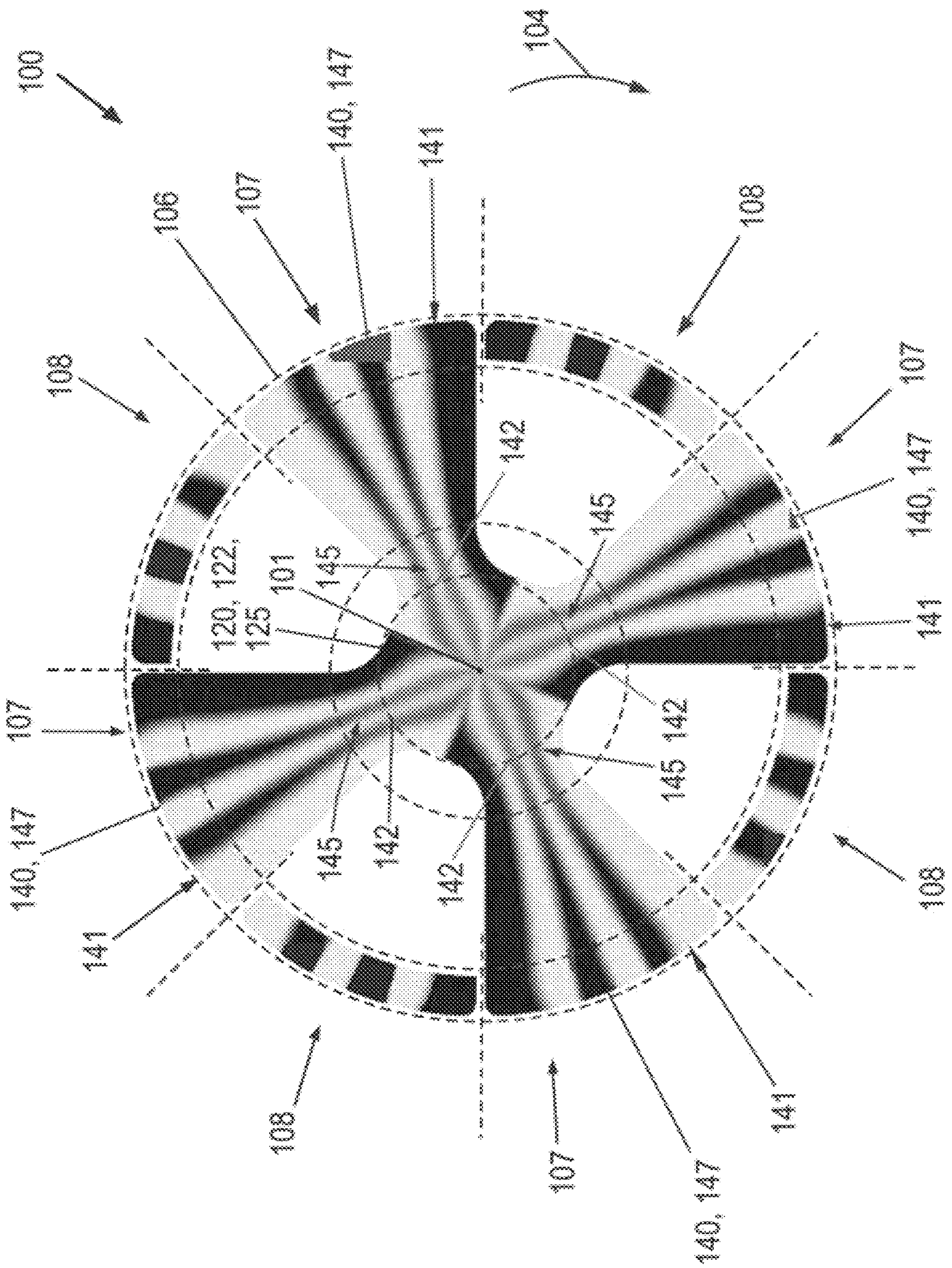
FIG. 10 is a cross-sectional cut perpendicular to the longitudinal axis through a first plurality of second passages of the first mixing segment.

FIG. 9 shows a cross-sectional cut perpendicular to the longitudinal axis 101 through the inlets 143 of the second passages 140 and FIG. 10 shows a cross-sectional cut perpendicular to the longitudinal axis 101 through the first plurality 147 of second passages 140. As can be seen from FIGS. 9 and 10, the inlets 143 of the first multitude 147 of second passages 140 connect to the longitudinal passages 160 that are placed in the first segments 107 of the annular peripheral portion 106. The first plurality 147 has four second passages 140 that are pairwise arranged opposite to each other with respect to the longitudinal axis 101.

The second passages 148 connect at their radially outer ends 141 to the longitudinal passages 160 and at their radially inner ends 142 via outlets 145 to a first longitudinal segment 125 of the cylindrical section 122 of the outlet section 120. Within the first longitudinal segment 125 of the cylindrical section 122, the individual material components entering from the second passages 140 further mix with each other.

Figure 11:
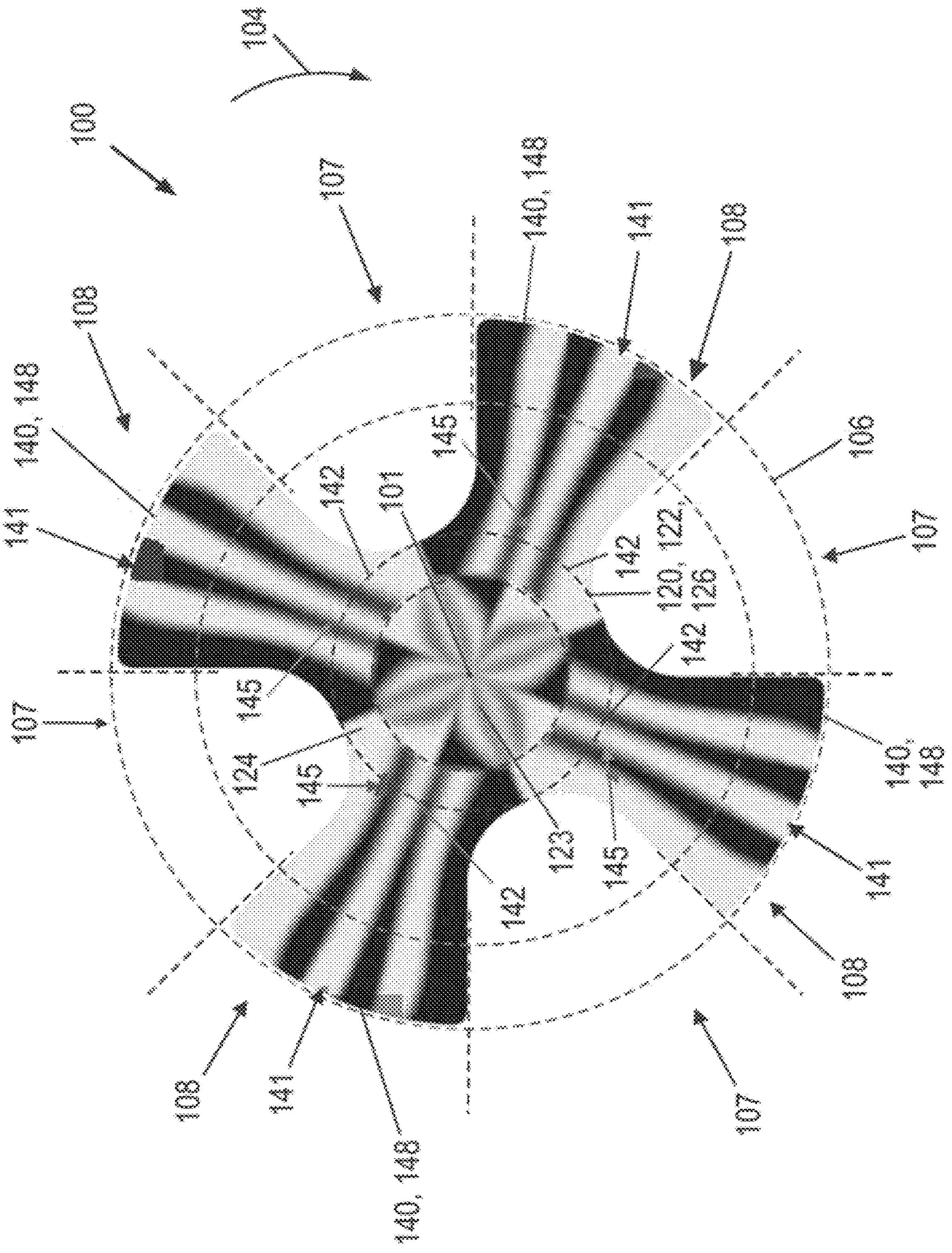
FIG. 11 is a cross-sectional cut perpendicular to the longitudinal axis through a second plurality of second passages of the first mixing segment.

FIG. 11 shows a cross-sectional cut perpendicular to the longitudinal axis 101 through the second plurality 148 of second passages 140. The second passages 140 of the second plurality 148 receive material portions from inlets 143 that are located in the second segments 108 of the annular peripheral portion 106 of the mixing segment 100. Like the first plurality 147, the second plurality 148 of second passages 140 has four second passages 140 that are pairwise arranged opposite to each other with respect to the longitudinal axis 101.

At their radially inner ends 142, the second passages 140 have outlets 145 that discharge into a second longitudinal segment 126 of the cylindrical section 122 of the outlet section 120. Thereby, the second longitudinal segment 126 of the outlet section 120 has a larger diameter perpendicular to the longitudinal axis 101 then the first longitudinal segment 125 shown in FIG. 10. Therefore, the material components exiting the second plurality 148 of second passages 140 become radially arranged in a radially outer region 124 of the cylindrical section 123 around the material components that have exited the first plurality 147 of second passages 140 and that are guided within a central region 123 of the cylindrical section 122 of the outlet section 120.

Figure 12:
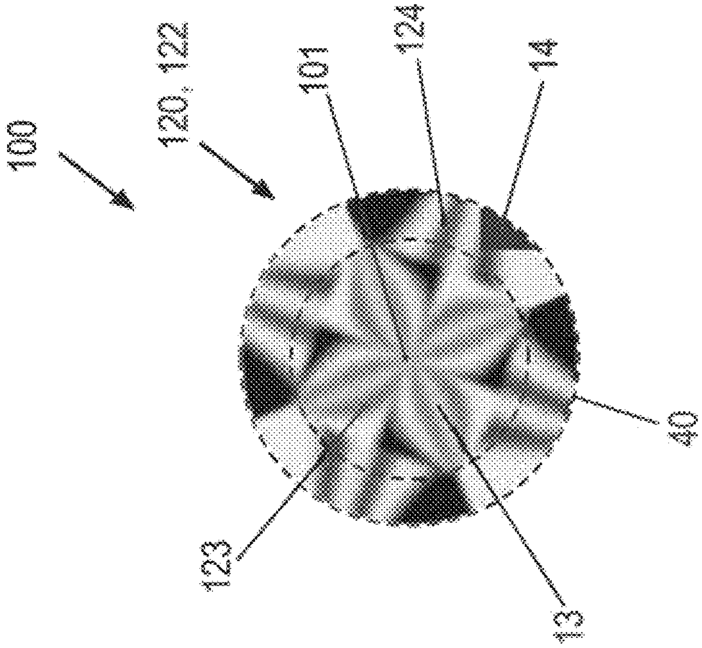
FIG. 12 is a cross-sectional cut perpendicular to the longitudinal axis through the end of a cylindrical section of an outlet section of the first mixing segment.

FIG. 12 shows a cross-sectional cut perpendicular to the longitudinal axis 101 through the outlet section 120 at the end of the cylindrical section 122. The cylindrical section 122 guides a radially inner material portion 13 that has been mixed by the first plurality 147 of second passages 140 within its central region 123 and a radially outer material portion 14 that has been mixed by the second plurality 148 second passages 140 in its radially outer region 124. The cylindrical section 122 forms a single tubular channel 40 that guides a mixture of the first and second component 11, 12 and directly adjoins the inlet section 110 of the following second mixing segment 105.

Figure 13:
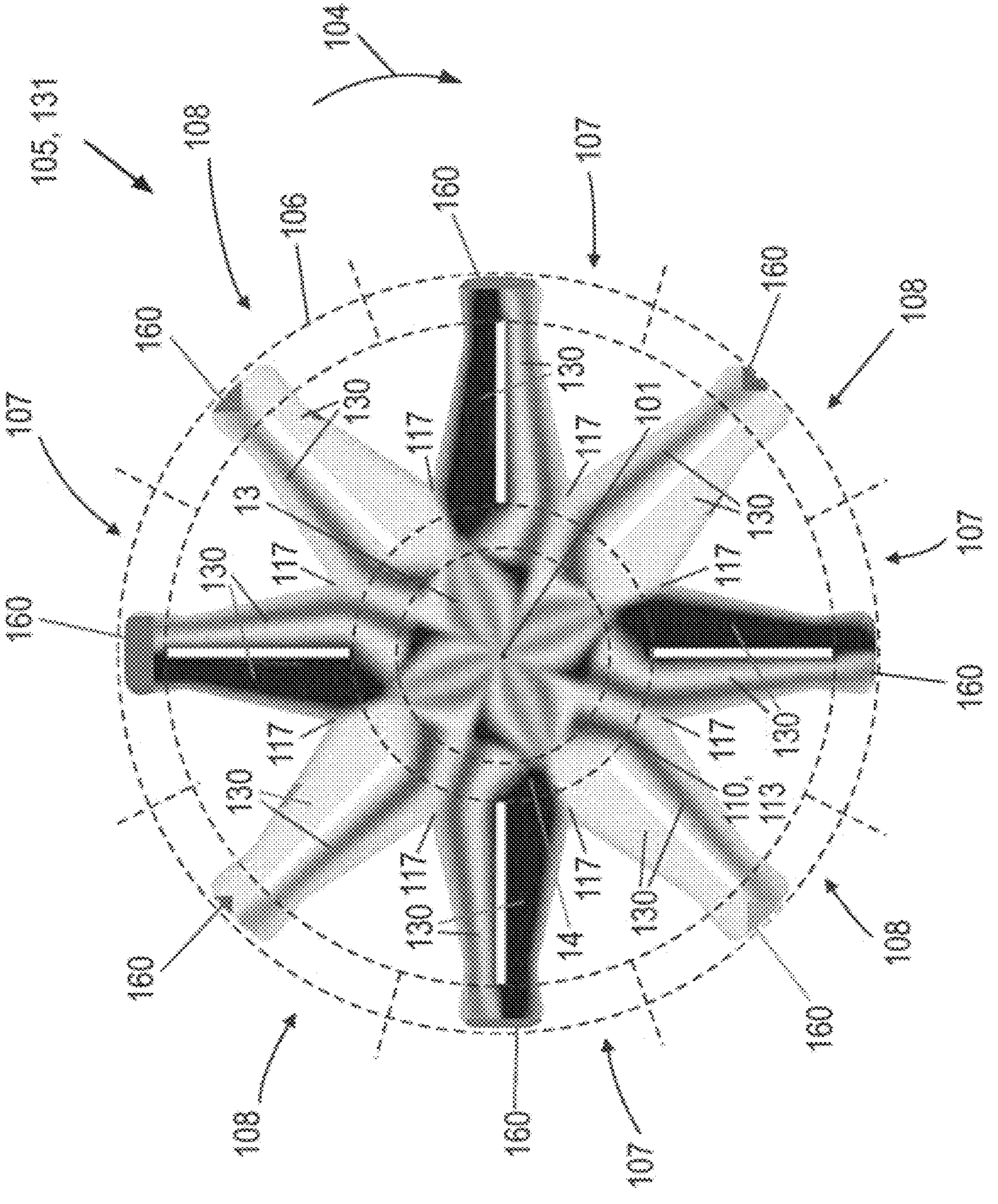
FIG. 13 is a cross-sectional cut perpendicular to the longitudinal axis through a first tier of a second mixing segment of the first static mixer.
Figure 14:
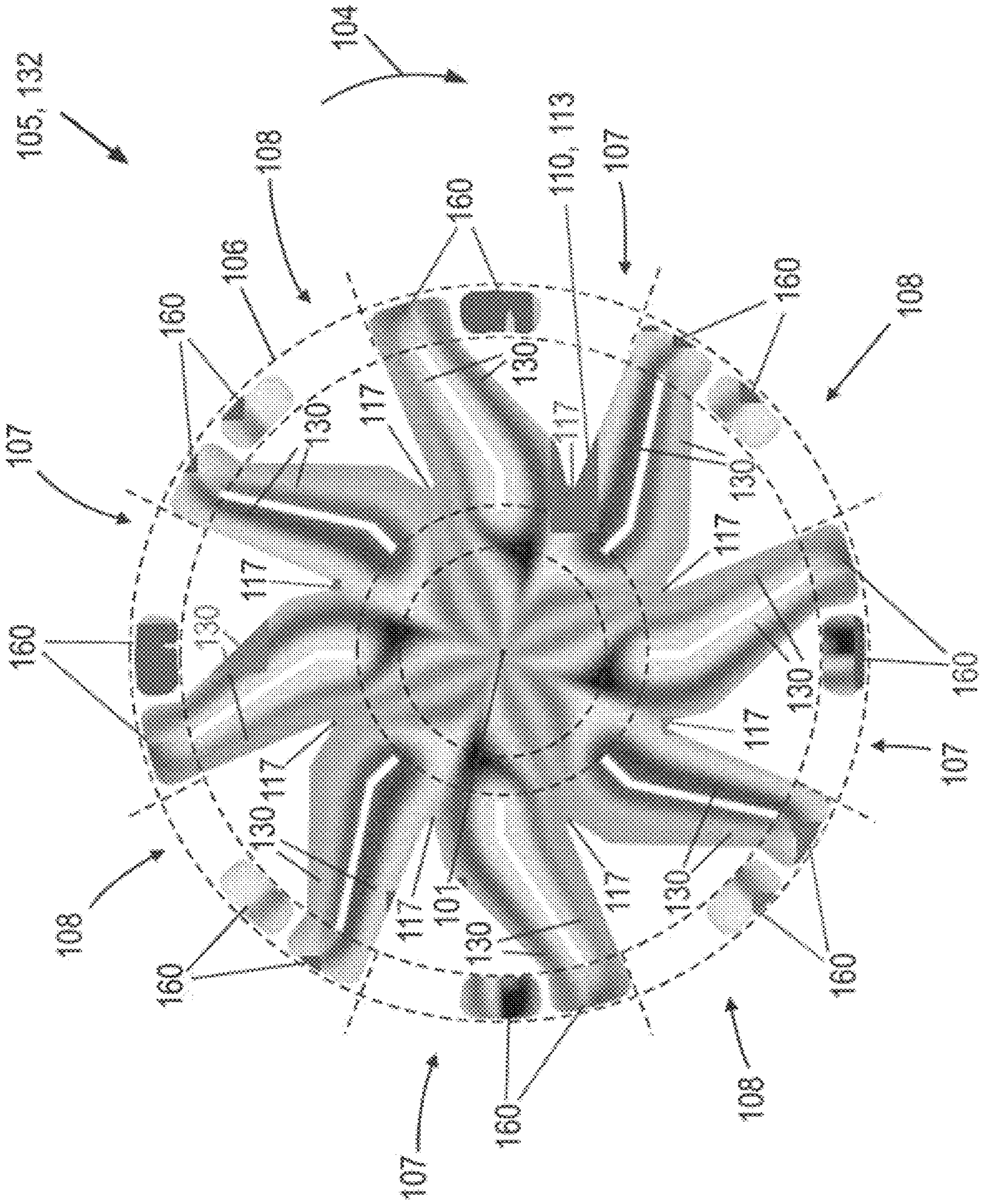
FIG. 14 is a cross-sectional cut perpendicular to the longitudinal axis through a second tier of the second mixing segment of the first static mixer.
Figure 15:
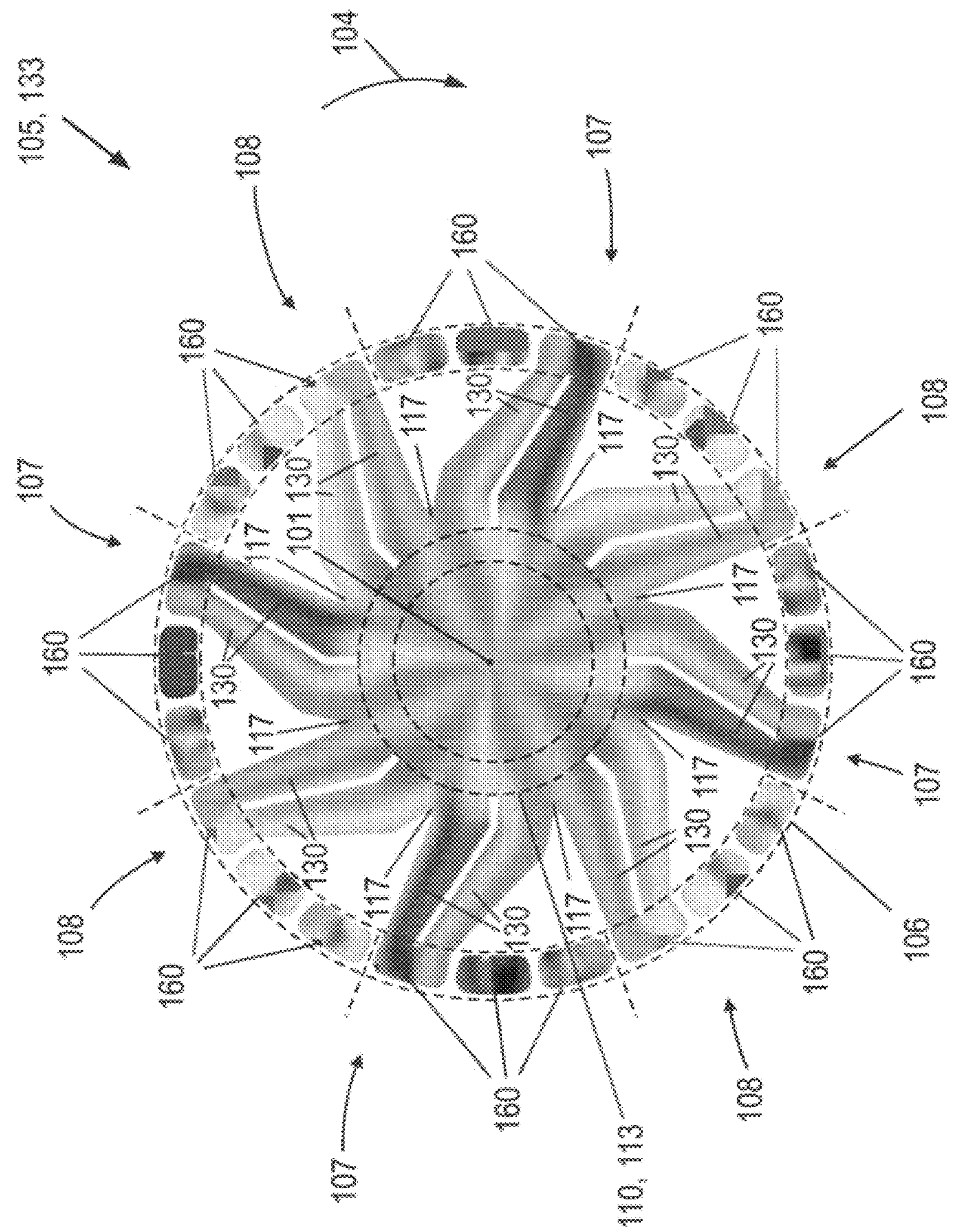
FIG. 15 is a cross-sectional cut perpendicular to the longitudinal axis through a third tier of the second mixing segment of the first static mixer.

FIGS. 13, 14 and 15 show cross-sectional cuts perpendicular to the longitudinal axis 101 through the first, second and third tier 131, 132, 133 of the second mixing segment 105. As long as no differences are apparent from the description and the Figures, the second mixing segment 105 is configured as it is disclosed in connection with the first mixing segment 100 and vice versa.

Within the individual tiers 131, 132, 133, the cylindrical section 113 of the inlet section 110 of the second mixing segment 105 has a plurality of common outlets 117, each of which connects to two radially arranged first passages 130. The common outlets 117 of the individual tiers 131, 132, 133 are longitudinally aligned with each other along the longitudinal axis 101. Different from the first and second outlets 114, 116 of the inlet section 110 of the first mixing segment 100, the common outlets 117 of the inlet section 110 of the second mixing segment 105 connect to a single tubular chamber of the cylindrical section 113 that guides the radially inner and outer material portions 13, 14 received from the outlet section 120 of the preceding first mixing segment 100.

Since the common outlets 117 a longitudinally aligned with each other, the outlets 117 of the first tier 131 receive the radially outermost portion of the material guided within the cylindrical section 113 and the following outlets 117 of the second and third tier 132, 133 receive radially more inward portions of the guided material. The first passages 130 then guide the material from the outlets 117 to the longitudinal passages 160 that are placed within the annular peripheral portion 106 of the second mixing segment 105.

The first and second mixing segment 100, 105 are rotated with respect to each other around the longitudinal axis 101 so that the centers of the first and second segments 107, 108 of the annular peripheral portion 106 of the second mixing segment 105 are centered at the radial edges of the first and second segments 107, 108 of the annular peripheral portion 106 of the first mixing segment 100.

Figure 16:
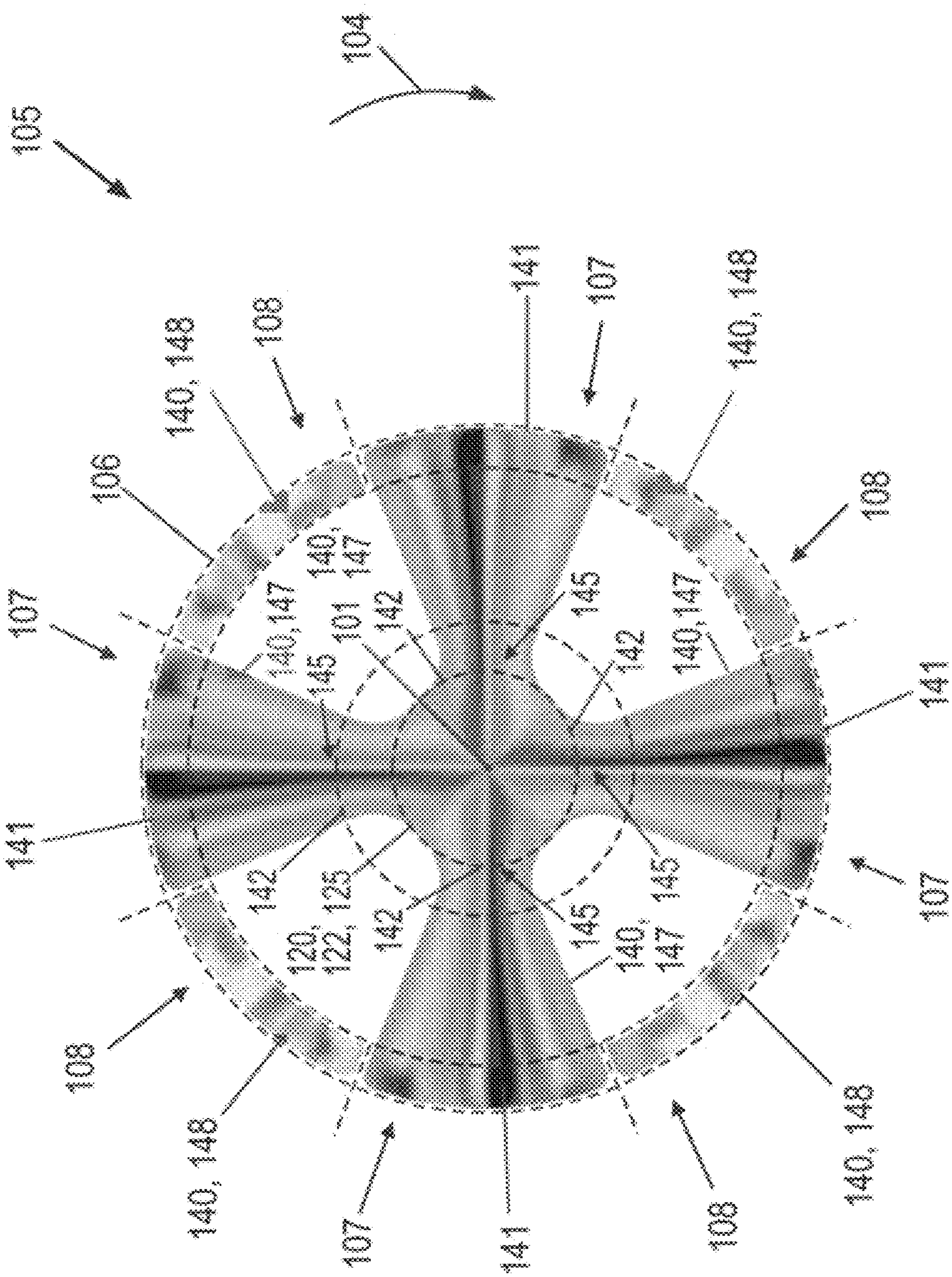
FIG. 16 is a cross-sectional cut perpendicular to the longitudinal axis through a first plurality of second passages of the second mixing segment of the first static mixer.
Figure 17:
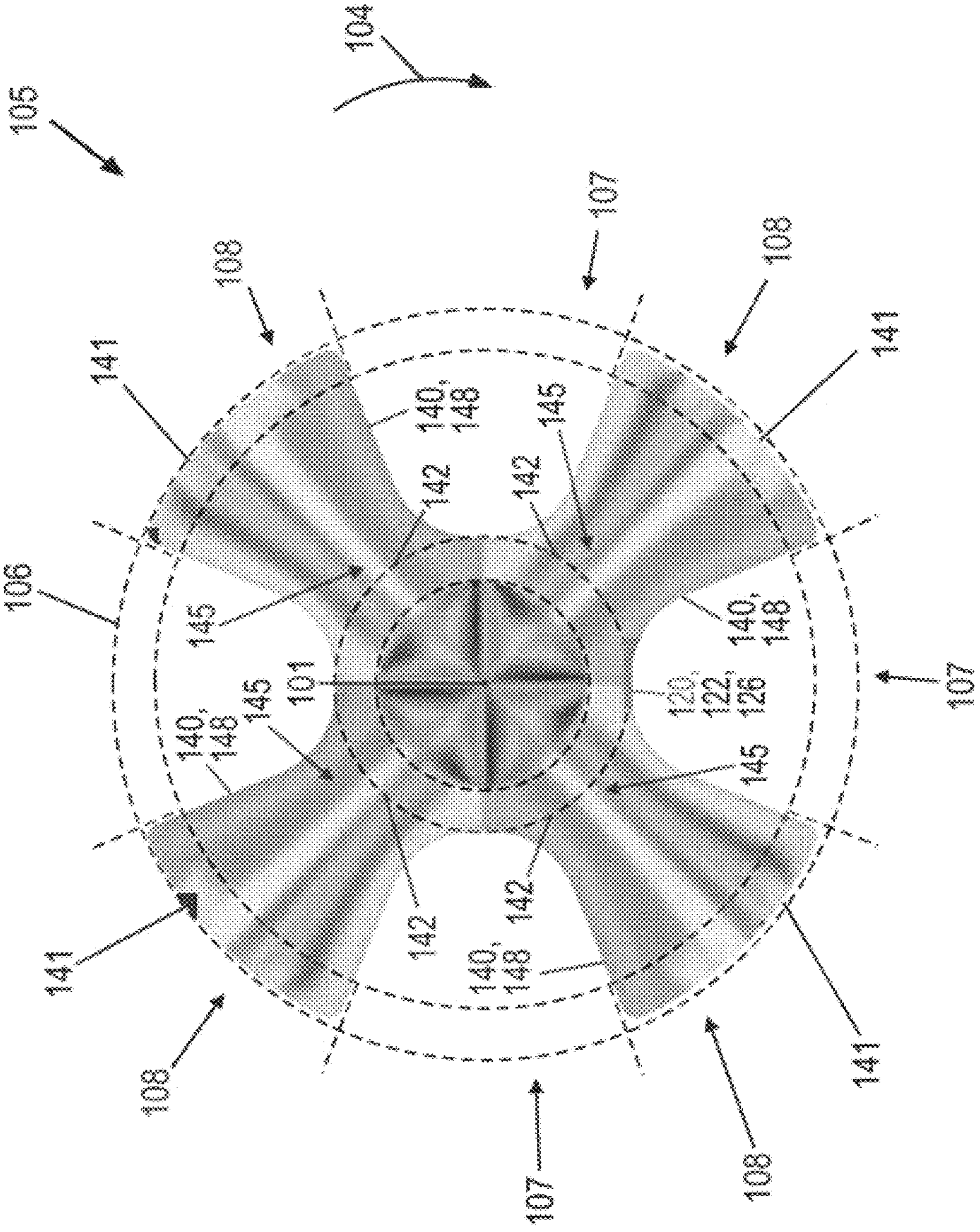
FIG. 17 is a cross-sectional cut perpendicular to the longitudinal axis through a second plurality of second passages of the second mixing segment of the first static mixer.

FIGS. 16 and 17 show the second mixing segment 105 in cross-sectional cuts perpendicular to the longitudinal axis

101 through the first and second longitudinal segment 125, 126 of the outlet section 120 and the first and second plurality 147, 148 of second passages 140. Like with the first mixing segment 100, the longitudinal passages 160 that are located within the first segments 107 of the annular peripheral portion 106 of the second mixing segment 105 connect to the first plurality 147 of second passages 140 and the longitudinal passages 160 that are located within the second segments 108 of the annular peripheral portion 106 connect to the second plurality 148 of second passages 140. At their radially inner ends 142, the second passages 140 of the first plurality 147 connect to the first longitudinal segment 125 of the cylindrical section 122 of the outlet section 120 and the second passages 140 of the second plurality 148 connect to the second longitudinal segment 126 of the cylindrical section 122 of the outlet section 120.

Figure 18:
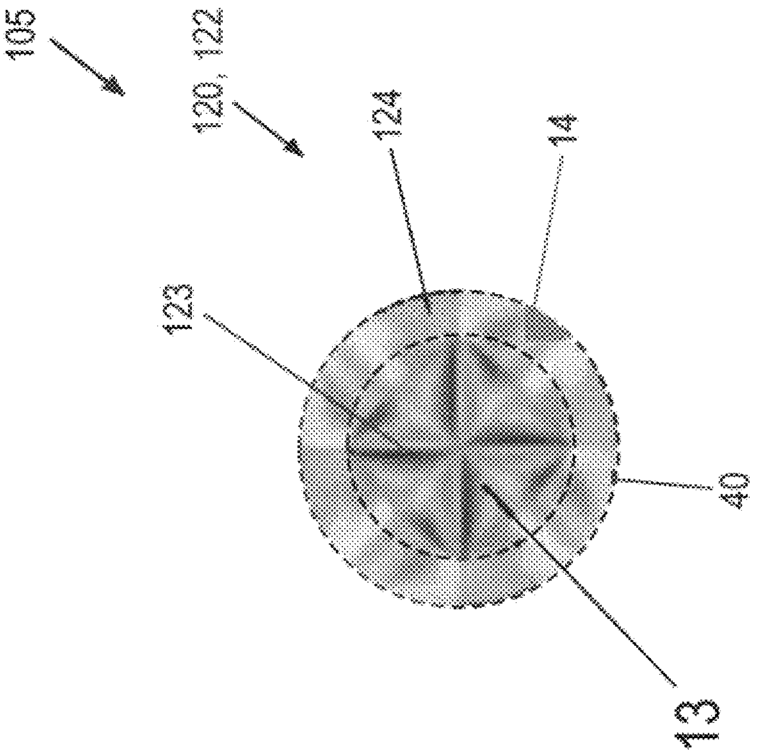
FIG. 18 is a cross-sectional cut perpendicular to the longitudinal axis through the outlet section of the second mixing segment of the first static mixer.

FIG. 18 show a cross-sectional cut perpendicular to the longitudinal axis 101 through the outlet section 120 of the second mixing segment 105. Like the outlet section 120 of the first mixing segment 100, the outlet section 120 of the second mixing segment 105 guides a radially inner material portion 13 received from the first plurality 147 of second passages 140 in a central region 123 and a radially outer material portion 14 received from the second plurality 148 of second passages 140 in a radially outer region 124. The outlet section 120 forms a single tubular channel 40 that can lead to a further mixing segment that is located in the downstream direction 102 from the second mixing segment 105.

In general, the static mixer 1 shown in FIGS. 1 to 18 can have further mixing segments that consecutively follow the second mixing segment 105 in the downstream direction 102 and that are configured as it is disclosed in connection with the second mixing segment 105. The further mixing segments can thereby be alternately rotated with respect to the longitudinal axis 101 so that, starting from the further mixing segment that immediately follows the second mixing segment 105 in the downstream direction 102, the further mixing segments are alternately aligned with the first mixing segment 100 and with the second mixing segment 105.

Figure 19:
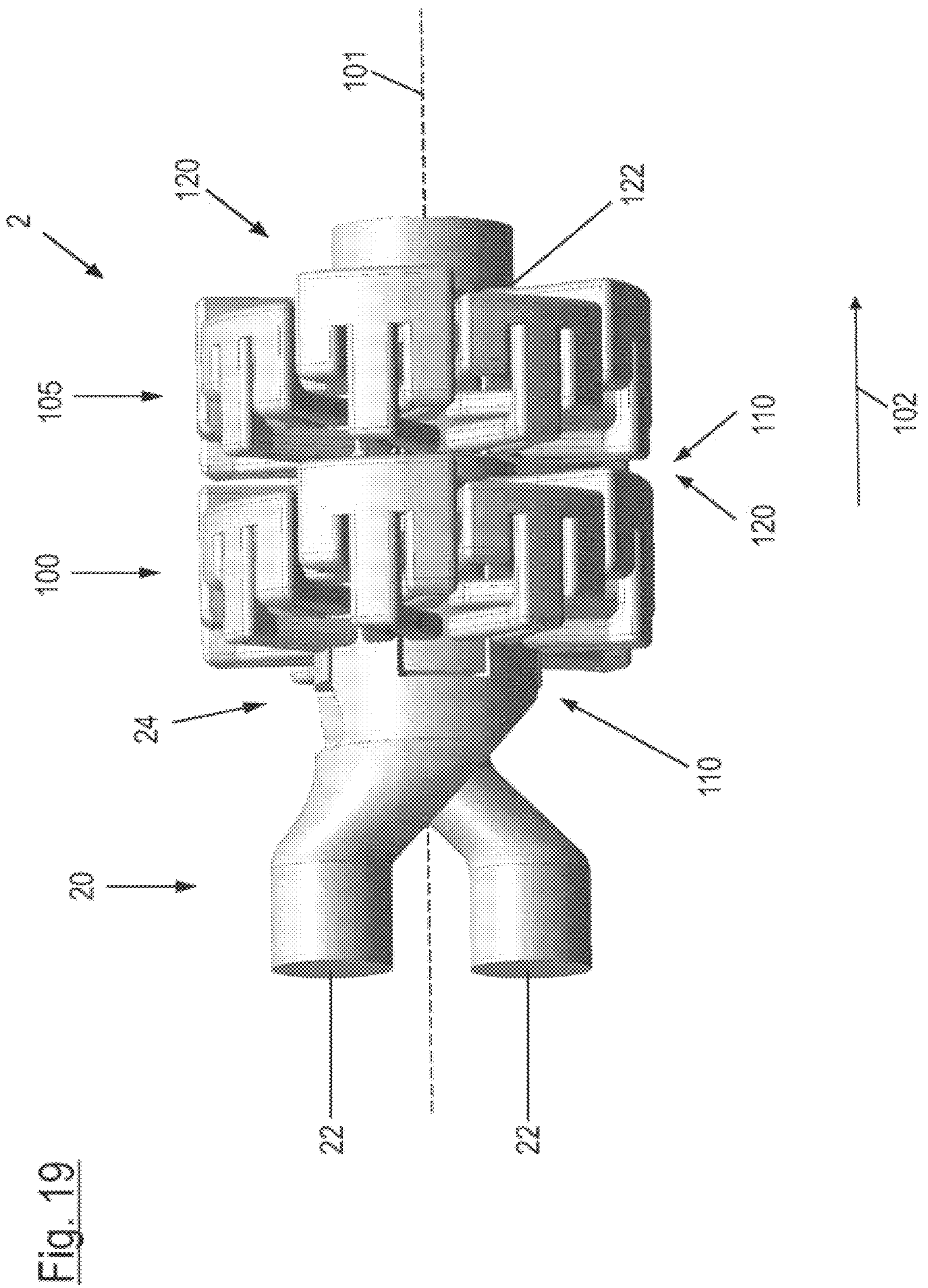
FIG. 19 is a second static mixer according to the present disclosure.

FIG. 19 shows a second static mixer 2 according to the present disclosure. As far as no differences are described or apparent from the Figures, the second static mixer 2 is configured as it is disclosed in connection with the first static mixer 1 shown in the previous Figures and vice versa.

Figure 20:
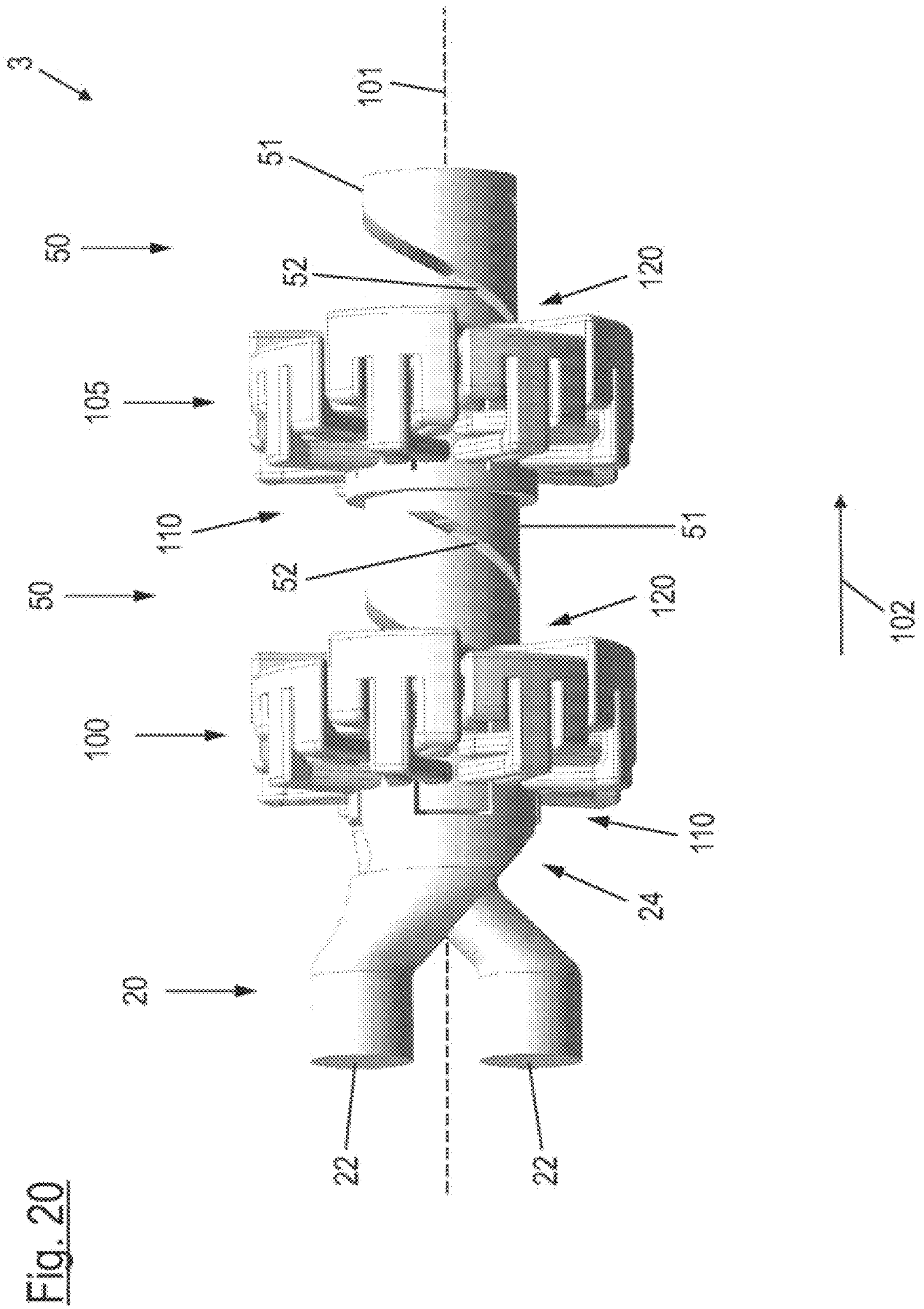
FIG. 20 is a third static mixer according to the present disclosure.

With the second static mixer 2, the first mixing segment 100, the second mixing segment 105 and all possible further mixing segments are longitudinally aligned with each other. This results, for example, in the first and second segments 107, 108 of the annular peripheral portion 106 of all mixing segments 100, 105 being arranged parallel to each other, FIG. 20 shows a third static mixer 3 according to the present disclosure. As far as no differences are described or apparent from the Figures, the third static mixer 3 is configured as it is disclosed in connection with the second static mixer 2 shown in FIG. 19 and vice versa.

With the third static mixer 3 shown in FIG. 20, the first and second mixing segment 100, 105, as well as all possible further mixing segments are connected via a further type of mixing segment 50 with each other. The further type of mixing segment 50 has a tubular section 51 and an helical inner wall 52 within this tubular section 51. The further type of mixing segment 50 connects the outlet sections 120 of each mixing segment 100, 105 to the inlet section 110 of the mixing segment 100, 105 that follows in the downstream direction 102.

Figure 22:
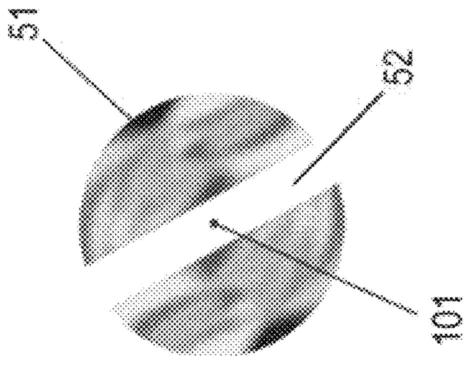
FIG. 22 is a cross-sectional cut perpendicular to the longitudinal axis through the further type of mixing segment at a second position along the downstream direction.
Figure 21:
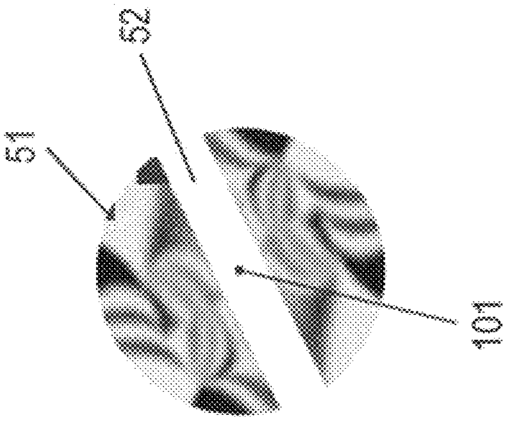
FIG. 21 is a cross-sectional cut perpendicular to the longitudinal axis through a further type of mixing segment of the third static mixer at a first position along a downstream direction.
Figure 23:
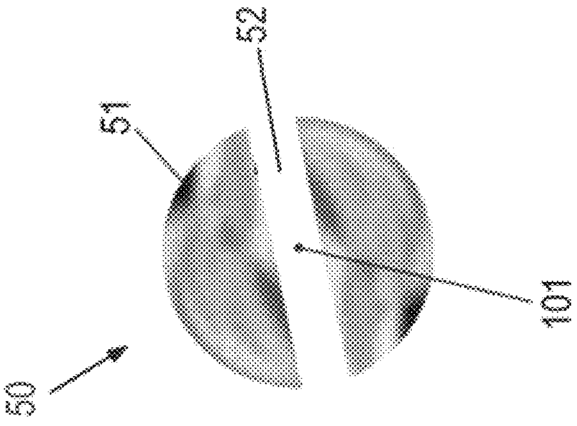
FIG. 23 is a cross-sectional cut perpendicular to the longitudinal axis through the further type of mixing segment at a third position along the downstream direction.

FIGS. 21 to 23 show cross-sectional cuts perpendicular to the longitudinal axis 101 through the further type of mixing segment 50 at consecutive positions along the downstream direction 102. From the upstream end of the mixing segment 50, which is shown in FIG. 21, to its downstream end shown in FIG. 23, the inner wall 52 of the mixing segment 50 rotates by one full turn around the longitudinal axis 101.

Figure 24:
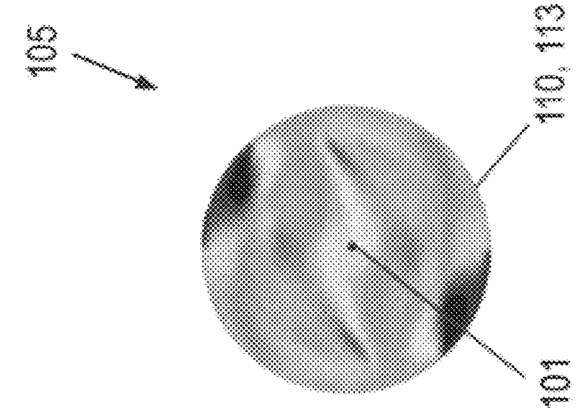
FIG. 24 is a cross-sectional cut perpendicular to the longitudinal axis through an inlet section of a second mixing segment of the third static mixer.
Figure 25:
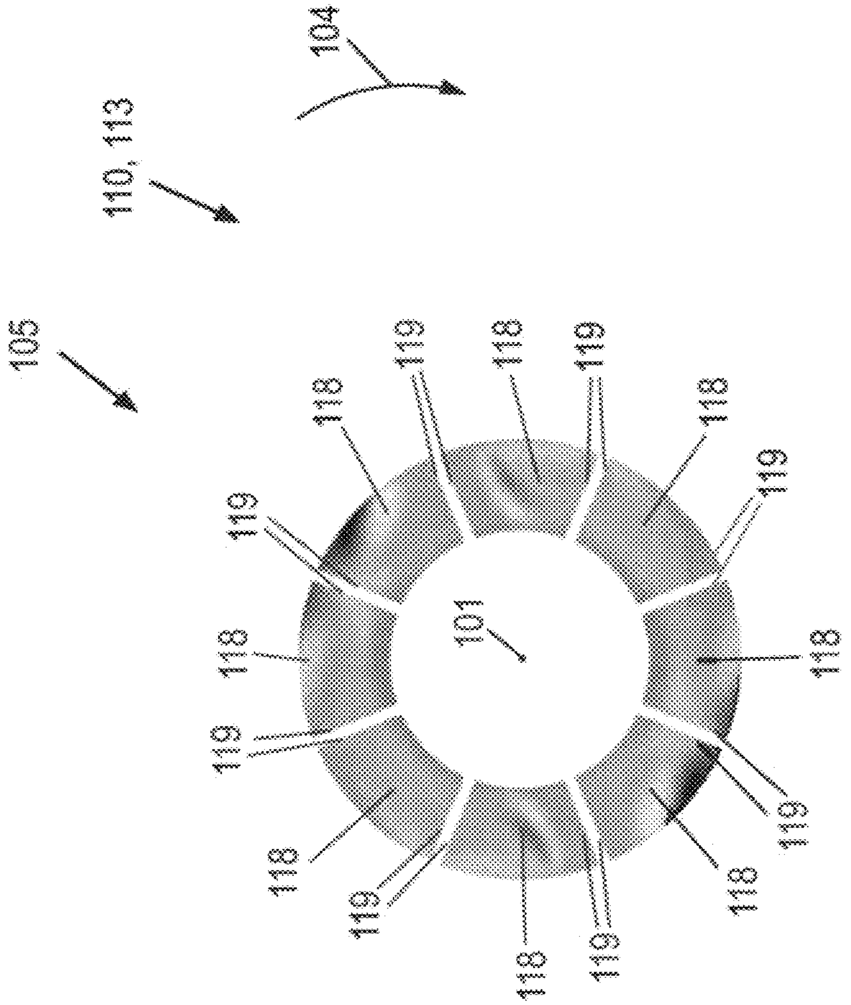
FIG. 25 is a further cross-sectional cut perpendicular to the longitudinal axis through the inlet section of the second mixing segment of the third static mixer.

FIG. 24 shows a cross-sectional cut perpendicular to the longitudinal axis 101 through the inlet section 110 of the second mixing segment 105 of the third static mixer 3. At the beginning of the inlet section 110, the diameter of the tubular channel leading into the inlet section 110 widens at the transition to the longitudinal cylindrical section 113 of the inlet section 110. At a further downstream position of the cylindrical section 113, which is shown in a cross-sectional cut perpendicular to the longitudinal axis 101 in FIG. 25, the material has been pushed into annular outer segments 118 of the cylindrical section 113 that are circumferentially distributed around the longitudinal axis 101 and separated from each other by radial walls 119.

Figure 26:
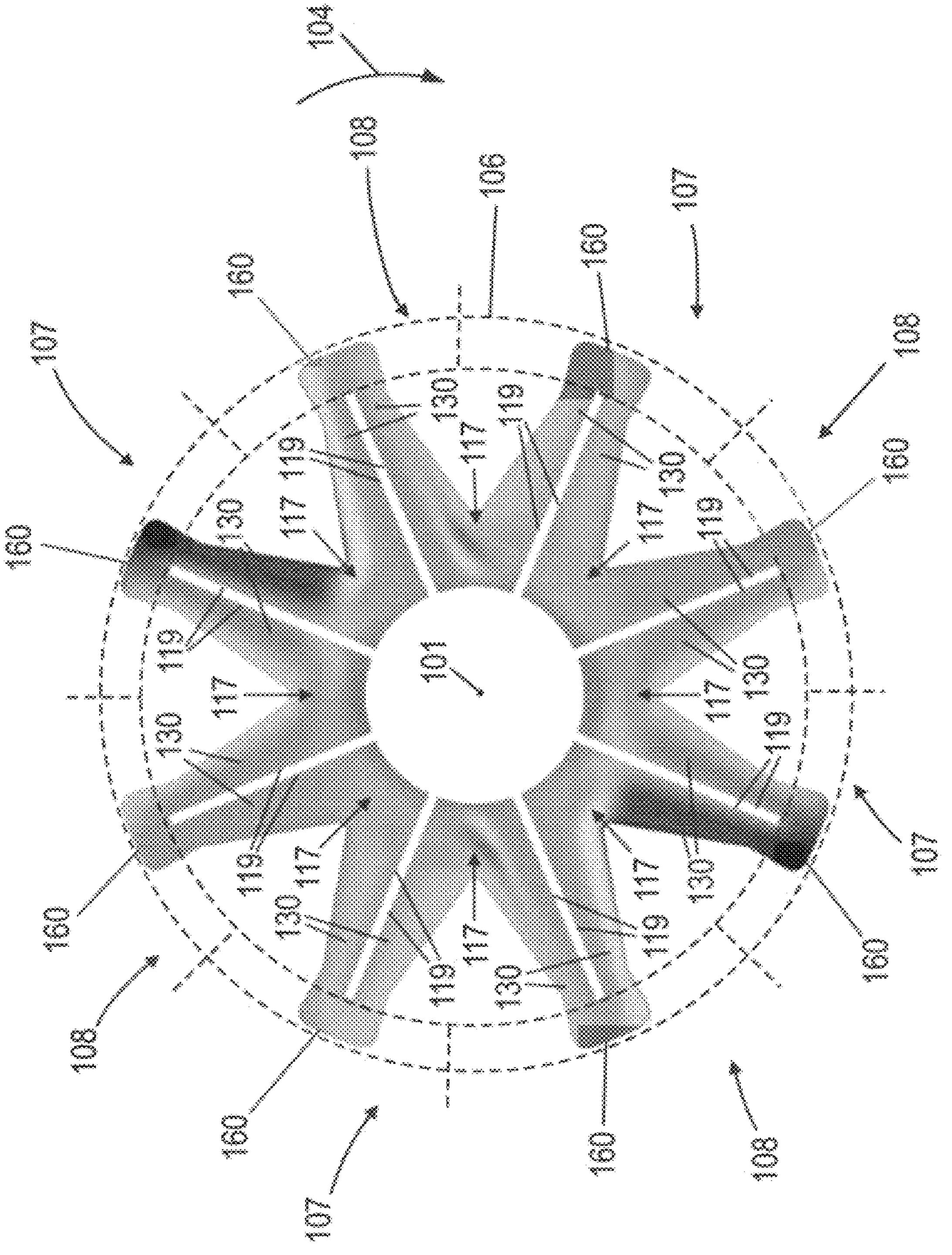
FIG. 26 is a cross-sectional cut perpendicular to the longitudinal axis through a first tier of radial outlets and radial first passages of the second mixing segment of the third static mixer.

As can be seen from FIG. 26, which shows a cross-sectional cut perpendicular to the longitudinal axis 101 through the following first tier 131 of radial outlets 117 and radial first passages 130 of the second mixing segment 105, each annular outer segment 118 discharges through one of the radial outlets 117 into two first passages 130 that are connected to separate longitudinal passages 160, wherein the longitudinal passages 160, which are in fluent connection with the same common outlet 117, are located in neighboring segments 107, 108 within the annular peripheral portion 106 of the second mixing segment 105.

With the third static mixer 3 shown in FIGS. 20 to 26, the radial walls 119 separating the individual annular outer segments 118 of the inlet section 110 of the second mixing segment 105 extend over all tiers 131, 132, 133. In alternative embodiments, also the first and second static mixer 1, 2 can have second mixing segments 105 that are configured like the second mixing segment 105 of the third static mixer 3 and have radial walls 119 separating individual annular outer segments 118 of the inlet section 110 of the respecting mixing segment 105.

Figure 27:
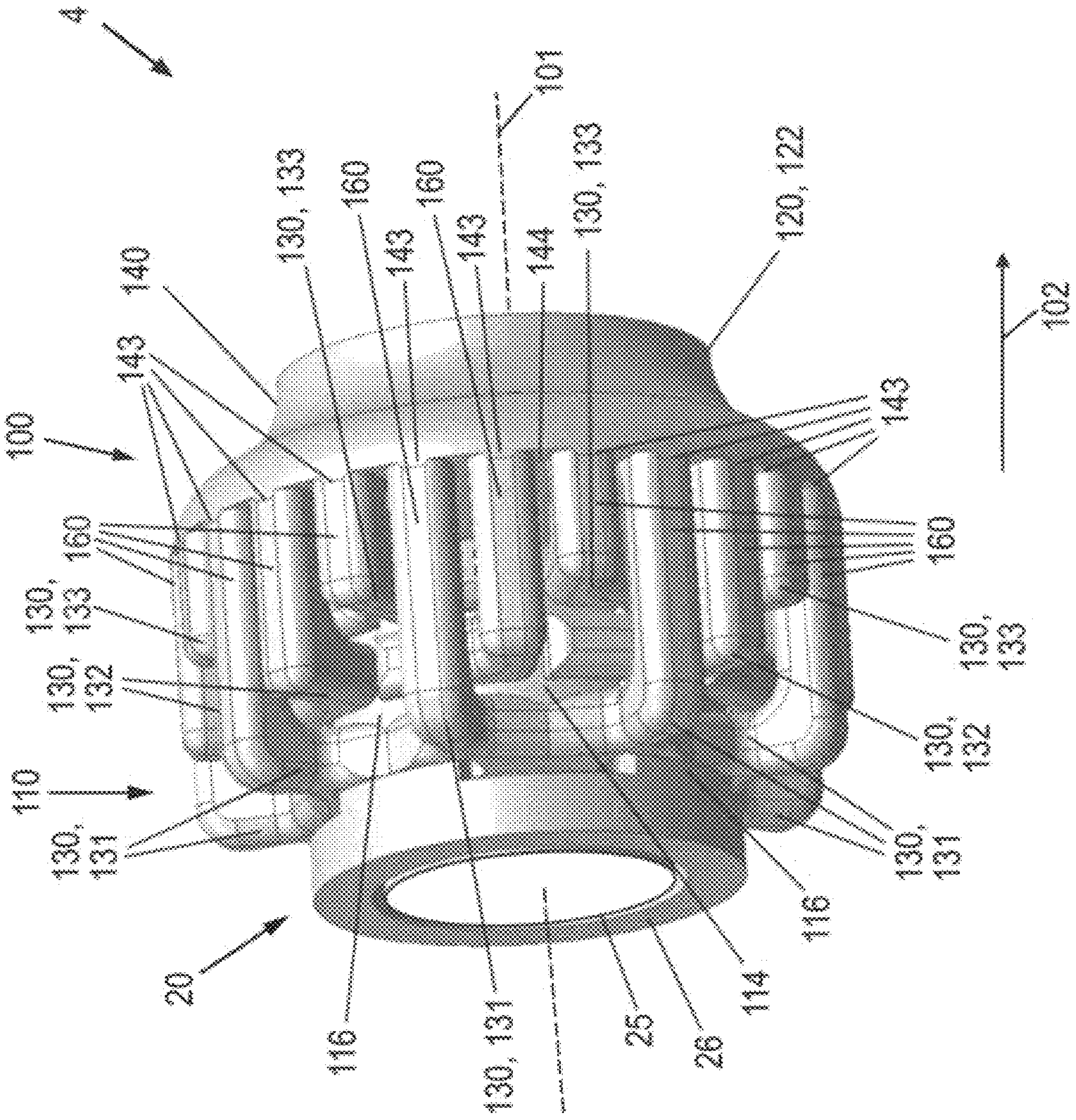
FIG. 27 is a fourth static mixer according to the present disclosure.

FIG. 27 shows a fourth static mixer 4 according to the present disclosure. As far as no differences are described or apparent from the Figures, the fourth static mixer 4 is configured as it is disclosed in connection with the first static mixer 1 and vice versa.

The fourth static mixer 4 has a first mixing segment 100 that connects to an inlet portion 20 that has a center tubular chamber 25 and an annular outer chamber 26. The center tubular chamber 25 guides a first material component and connects to a first inlet of an inlet section 110 of the first mixing segment 100 and the annular outer chamber 26 guides a second material component and connects to a separate second inlet of the inlet section 110.

Figure 28:
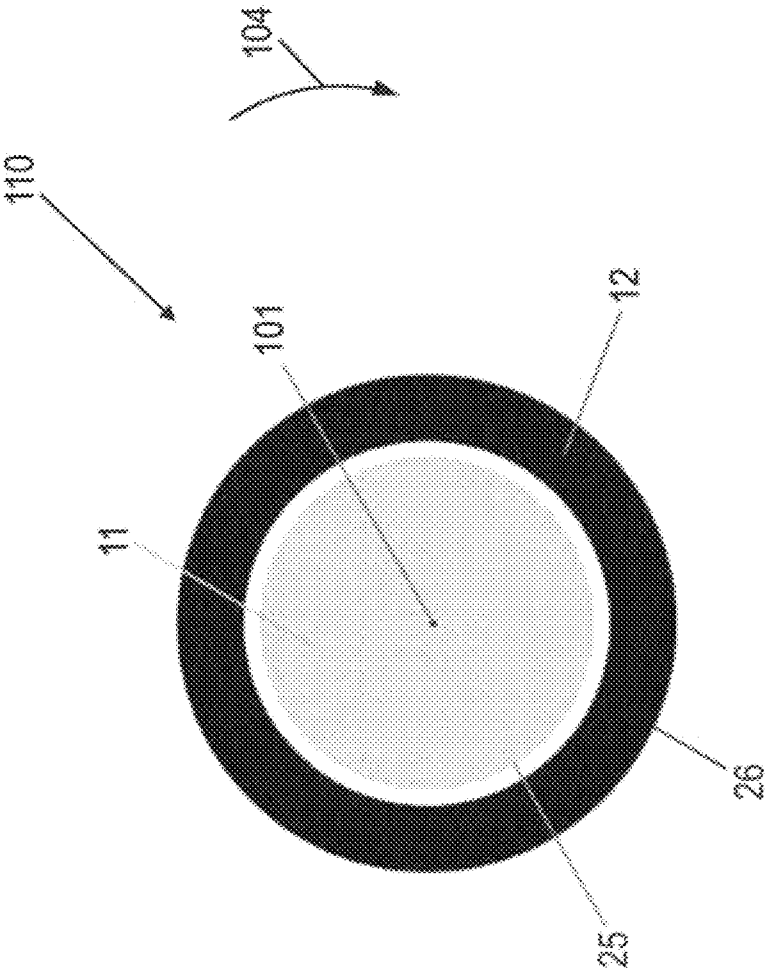
FIG. 28 is a cross-sectional cut perpendicular to a longitudinal axis through an inlet portion of the fourth static mixer.
Figure 29:
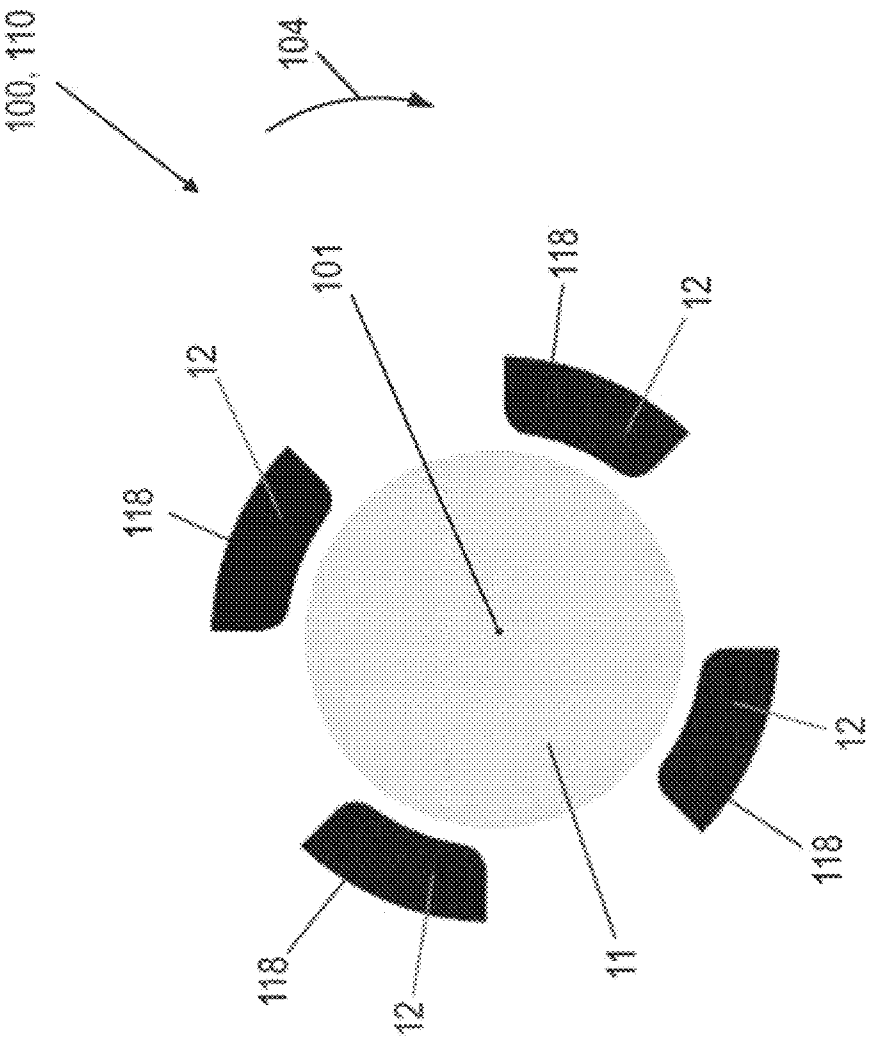
FIG. 29 is a cross-sectional cut perpendicular to the longitudinal axis through an inlet section of a first mixing segment of the fourth static mixer.

FIG. 28 shows a cross-sectional cut perpendicular to the longitudinal axis 101 through the inlet portion 20 with the center tubular chamber 25 guiding the first material component 11 and the separate annular outer chamber 26 guiding the second material component 12. FIG. 29 shows a cross-sectional cut perpendicular to the longitudinal axis 101 through the inlet section 110 of the first mixing segment 100 of the fourth static mixer 4, which guides the first material component 11 in a single central chamber and the second material component 12 in a radially outer chamber within four annular segments 118 that are evenly spaced apart from each other and distributed around the longitudinal axis 101.

As can be seen from FIG. 27, the inlet section 110 of the first mixing segment 100 of the fourth mixer 4 has a plurality of first radial outlets 114 and a plurality of second radial outlets 116 that connect to radial first passages 130. The first radial outlets 114 discharge the first material component 11 and the second radial outlets 116 discharge the second material component 12. The radial outlets 114, 116 and the first passages 130 are arranged in a first, second and third tier 131, 132, 133 along the longitudinal axis 101.

Figure 30:
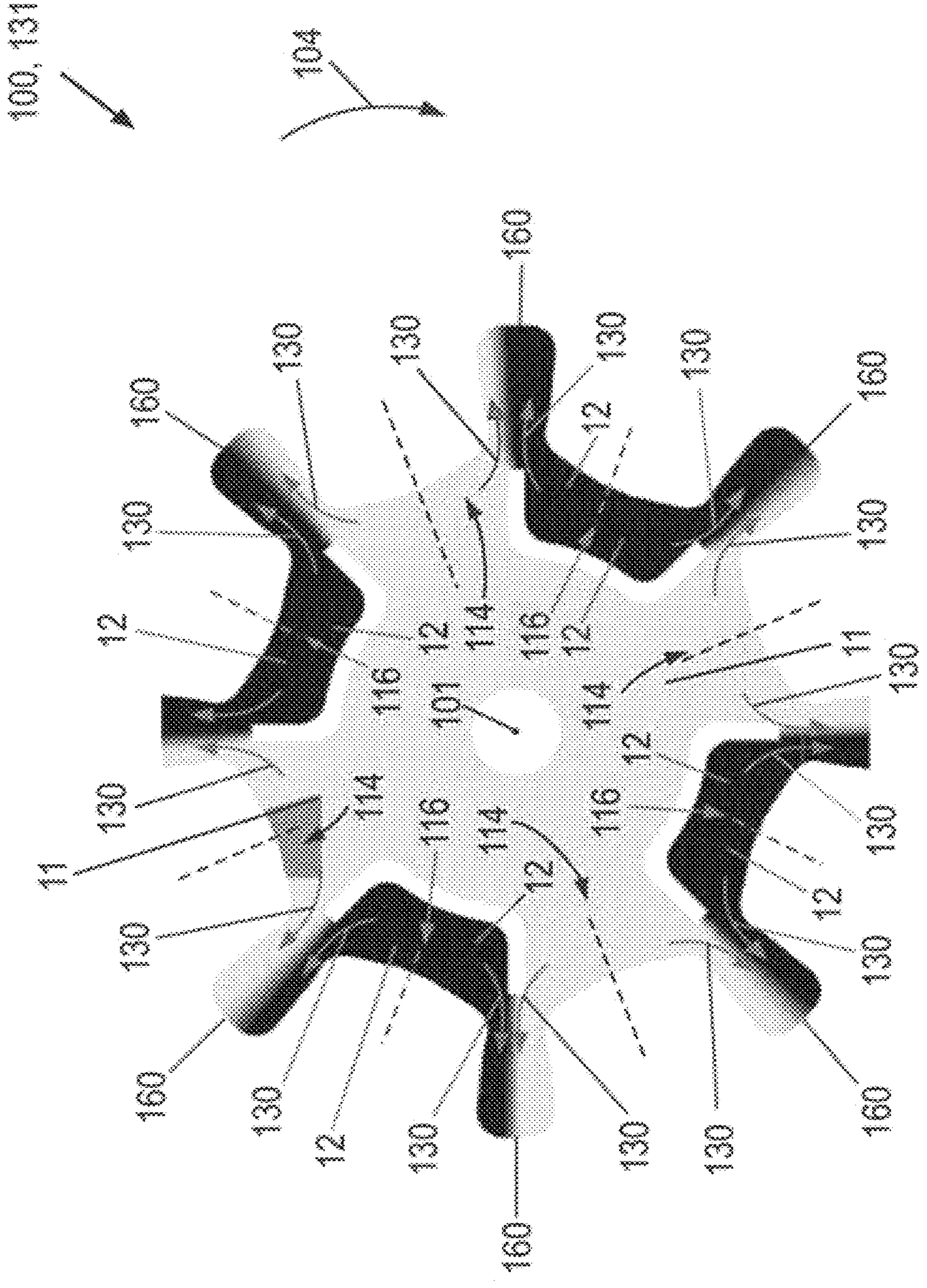
FIG. 30 is a cross-sectional cut perpendicular to the longitudinal axis through a first tier of first passages of the first mixing segment of the fourth static mixer.
Figure 31:
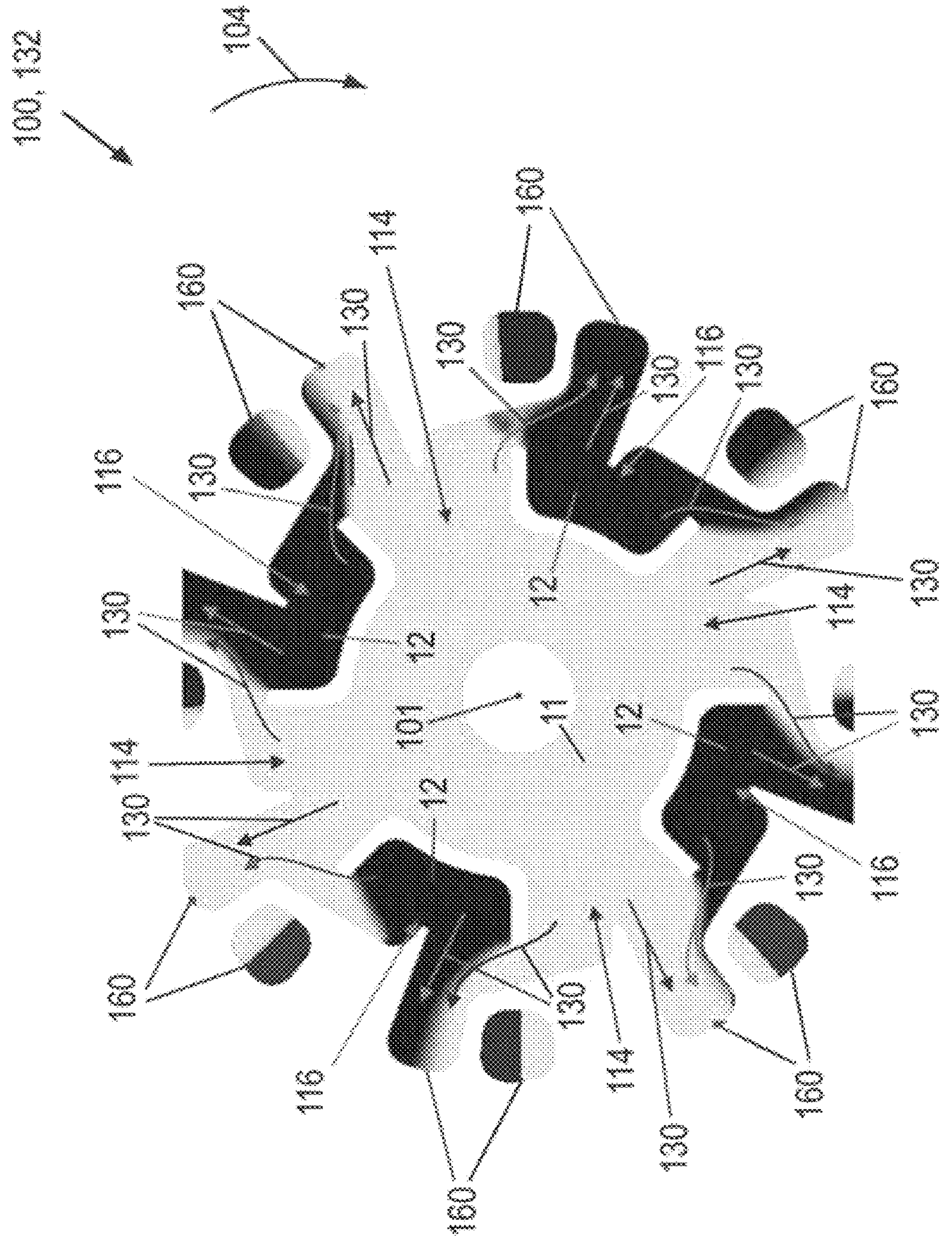
FIG. 31 is a cross-sectional cut perpendicular to the longitudinal axis through a second tier of first passages of the first mixing segment of the fourth static mixer.
Figure 32:
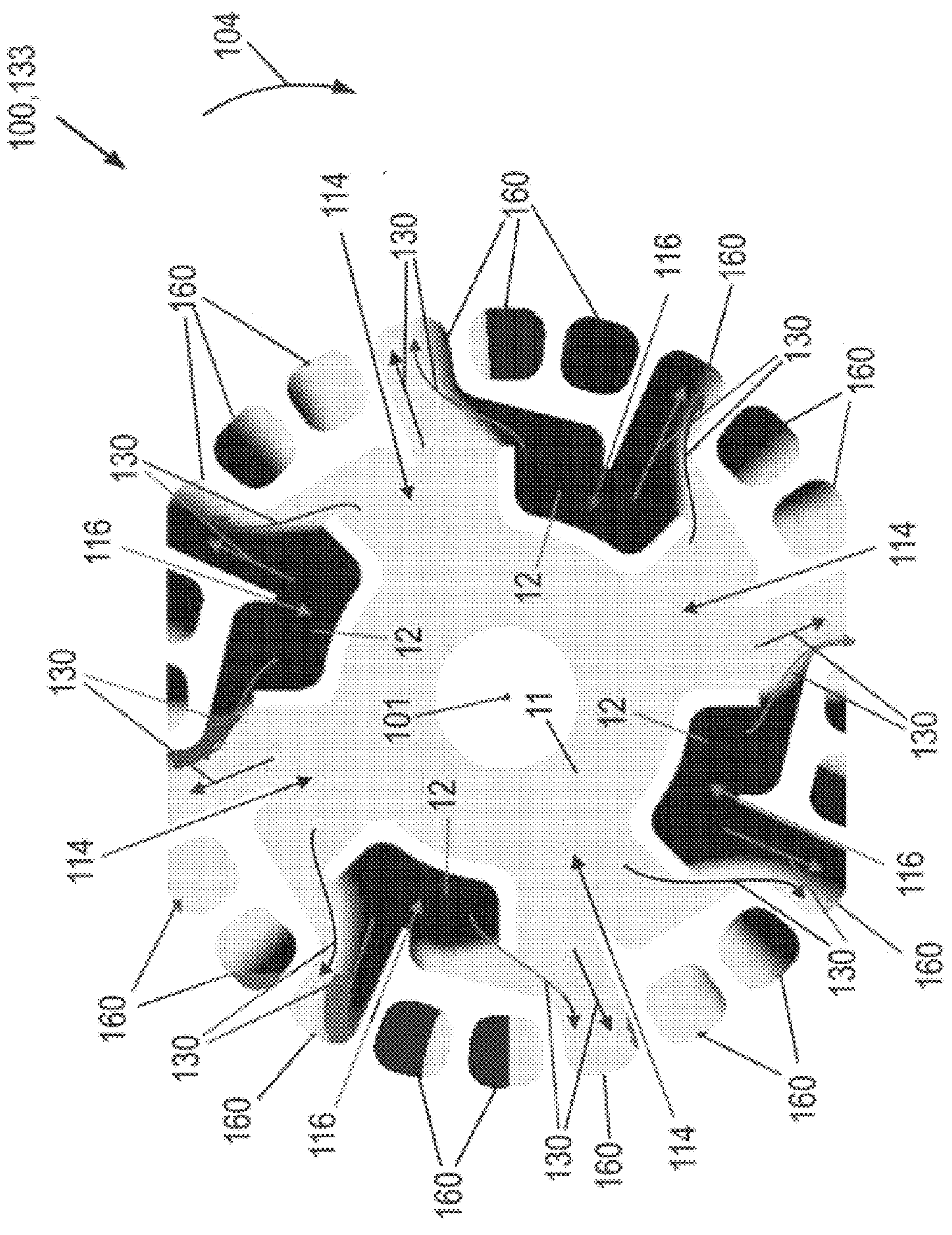
FIG. 32 is a cross-sectional cut perpendicular to the longitudinal axis through a third tier of first passages of the first mixing segment of the fourth static mixer.

FIGS. 30, 31 and 32 show cross-sectional cuts perpendicular to the longitudinal axis 101 through the first, second and third tier 131, 132, 133, respectively. The first and second radial outlets 114, 116 of the individual tiers 131, 132, 133 are longitudinally aligned with each other. Each radial outlet 114, 116 is connected to two first passages 130 that lead to separate longitudinal passages 160. Each longitudinal passage 160 receives material components 11, 12 from two first passages 130, wherein one of the first passages 130 is connected to one of the first radial outlets 114 and the other one of the first passages 130 is connected to a neighboring one of the second radial outlets 116. With the further embodiment of the mixing segment 100, the first passages 130 that are connected to the same longitudinal passage 160 already join with each other directly at the first and second radial outlets 114, 116.

As can be seen from FIG. 27, the longitudinal passages 160 of the mixing segment 100 according to the further embodiment all discharge via inlets 143 to a single radial second passage 140 that circumferentially surrounds the longitudinal axis 101. The second passage 140 has a cylindrical shape and tapers down in the downstream direction 102 along the longitudinal axis 101.

Figure 33:
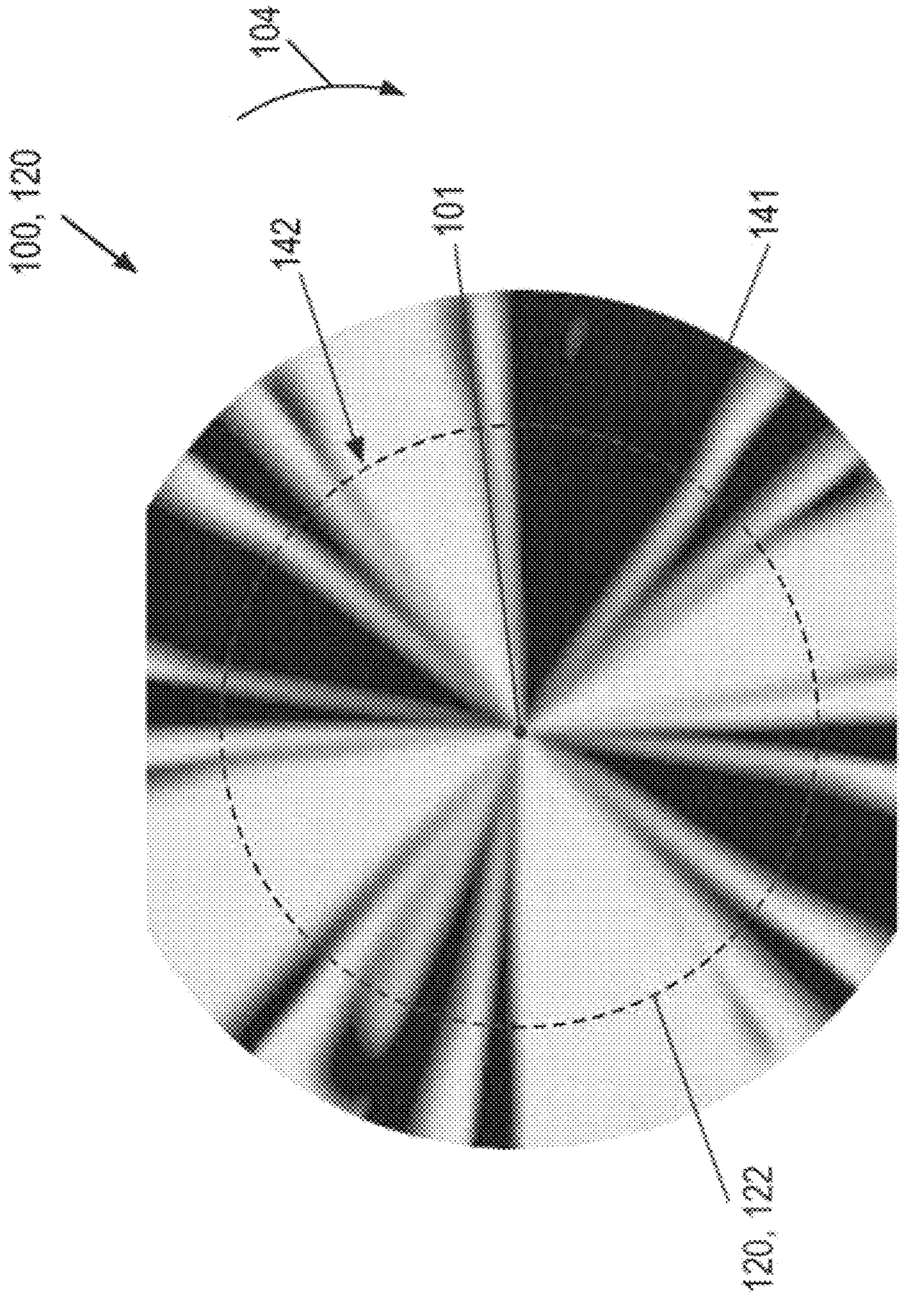
FIG. 33 is a cross-sectional cut perpendicular to the longitudinal axis through a second passage of the first mixing segment of the fourth static mixer.
Figure 34:
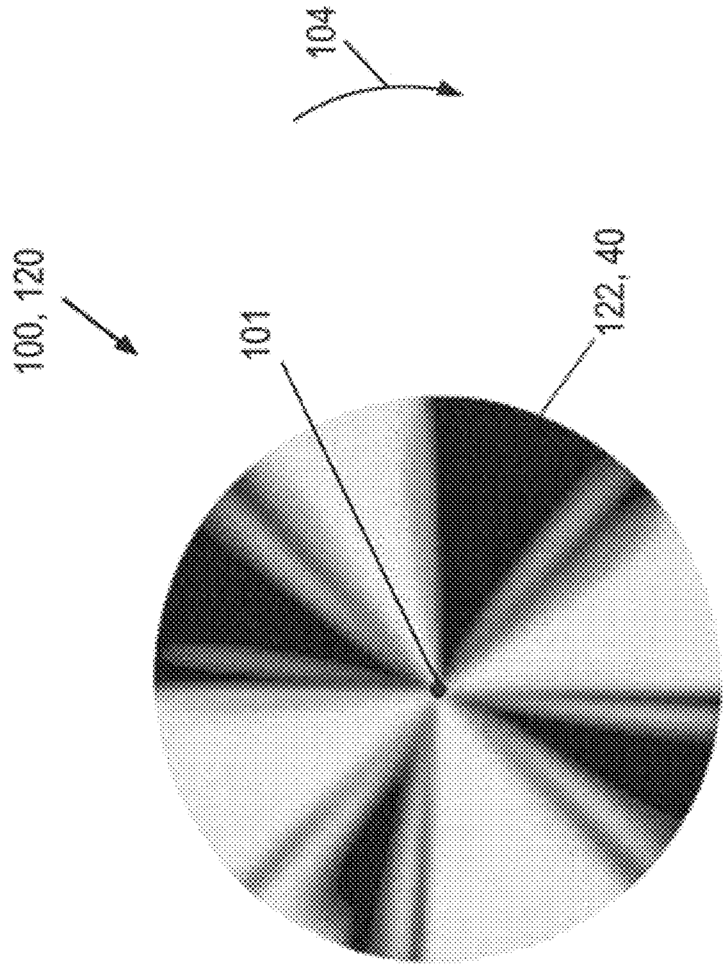
FIG. 34 is a cross-sectional cut perpendicular to the longitudinal axis through an outlet section of the first mixing segment of the fourth static mixer.

FIG. 33 shows a cross-sectional cut perpendicular to the longitudinal axis 101 through the second passage 140. The material portions entering from the longitudinal passages 160 mix while propagating radially from the radially outer ends 141 of the second passage 140 towards its radially inner end 142 that circumferentially connects to the cylindrical section 122 of the outlet section 120 of the first mixing segment 100. FIG. 34 shows a cross-sectional cut perpendicular to the longitudinal axis 101 through the outlet section 120 of the mixing segment 100 shown in FIG. 27. The outlet section 120 guides the mixed material components within the single cylindrical section 122 that forms a tubular channel 40 and can connect to a following further mixing segment.

Due to the different configuration of the first and second passages 130, 140, the individual static mixers 1, 2, 3, 4 and mixing segments 100, 105 disclosed herein achieve different mixing results for mixing viscous materials in laminar flow. The fourth static mixer 4 shown in FIG. 27 has a pressure drop of $\Delta p=0.58$ and a coefficient of variation of mixing CoV=0.816, the portion of the first static mixer 1 shown in FIG. 2 a pressure drop of $\Delta p=0.68$ and a coefficient of variation of mixing CoV=0.680, the entire first static mixer 1 shown in FIG. 1 a pressure drop of $\Delta p=1.07$ and a coefficient of variation of mixing CoV=0.401, the second static mixer 2 shown in FIG. 19 a pressure drop of $\Delta p=1.07$ and a coefficient of variation of mixing CoV=0.290, and the third static mixer 3 shown in FIG. 20 a pressure drop of $\Delta p=1.27$ and a coefficient of variation of mixing CoV=0.097.

Exemplary embodiments of mixing segments and static mixers according to the present disclosure are summarized in the following list of enumerated embodiments:

1. A mixing segment 100, 105 for a static mixer 1, having one inlet section 110, one outlet section 120 disposed opposite of the inlet section 110, a longitudinal axis 101 being defined between the inlet section 110 and the outlet section 120, a plurality of first passages 130, each first passage 130 adjoining the inlet section 110 and being arranged radially with respect to the longitudinal axis 101, at least one second passage 140 adjoining the outlet section 120 and being arranged radially with respect to the longitudinal axis 101, the first passages 130 being in fluid connection with the second passage 140 with flow paths being defined between the inlet section 110, the first passages 130, the second passage 140 and the outlet section 120.

2. The mixing segment 100, 105 according to embodiment 1, wherein the outlet section 120 is arranged in a central portion of the mixing segment 100, 105 at the longitudinal axis 101, wherein the outlet section 120 comprises a longitudinal cylindrical section 122, wherein the second passage 140 is radially connected to the longitudinal cylindrical section 122.

3. The mixing segment 100, 105 according to one of the preceding embodiments, wherein the second passage 140 comprises two, three or more inlets 143, wherein each of the inlets 143 is connected to at least one of the first passages 130, wherein the inlets 143 are, for example, located at a radially outer part 141 of the second passage 140.

4. The mixing segment 100, 105 according to one of the preceding embodiments, wherein the second passage 140 comprises an outlet 145 that is adjoined to the outlet section 120 of the mixing segment 100, 105 at a radially inner part 142 of the second passage 140.

5. The mixing segment 100, 105 according to one of the preceding embodiments, wherein the second passage 140 is centered around the longitudinal axis 101 and has a cylindrical shape, for example a tapered cylindrical shape.

6. The mixing segment 100, 105 according to one of the preceding embodiments having at least two second passages 140 being arranged radially with respect to the longitudinal axis 101, wherein a first of the second passages 140 is connected to a first longitudinal segment 125 of the outlet section 120 and a second of the second passages 140 is connected to a second longitudinal segment 126 of the outlet section 120, the second longitudinal segment 126 being located from the first longitudinal segment 125 in a downstream direction 102 along the longitudinal axis 101.

7. The mixing segment 100, 105 according to embodiment 5 having a first plurality 147 of second passages 140 being arranged radially and being connected to the first segment 125 of the outlet section 120, having a second plurality 148 of second passages 140 being arranged radially and being connected to the second segment 126 of the outlet section 120, wherein, for example, the passages of the first plurality 147 of second passages 140 and the passages of the second plurality 148 of second passages 140 are alternately located circumferentially around the longitudinal axis 101.

8. The mixing segment 100, 105 according to one of embodiments 5 to 6, wherein the first passages 130 that are connected to one of the second passages 140 are adjoined to the inlet section 110 above each other along the longitudinal axis 101.

9. The mixing segment 100, 105 according to one of the preceding embodiments, wherein the mixing segment 100, 105 comprises a plurality of longitudinal passages 160, each longitudinal passage 160 being arranged in parallel with respect to the longitudinal axis 101 and connecting one or more of the first passages 130 with the second passage 140, wherein, for example, the longitudinal passages 160 are arranged circumferentially around the longitudinal axis 101 in an annular peripheral portion 106 of the mixing segment 100, 105 surrounding the longitudinal axis 101.

10. The mixing segment 100, 105 according to embodiment 8, wherein the longitudinal passages 160 are configured as separate tubes.

11. The mixing segment 100, 105 according to one of embodiments 8 to 9, wherein two or more first passages 130 are adjoined to one longitudinal passage 160.

12. The mixing segment 100, 105 according to one of the preceding embodiments, wherein the inlet section 110 is arranged in a central portion of the mixing segment 100, 105, wherein the inlet section 110 comprises a longitudinal cylindrical section 113, wherein the first passages 130 are radially connected to the cylindrical section 113.

13. The mixing segment 100, 105 according to one of the preceding embodiments, wherein the first passages 130 are configured as separate tubes.

14. The mixing segment 100, 105 according to one of the preceding embodiments, wherein the mixing segment 100, 105 has two, three or more tiers 131, 132, 133 of first passages 130 arranged along the longitudinal axis 101, wherein, for example, the first passages 130 of a first tier 131 and the first passages 130 of a second tier 132 are pairwise connected to the inlet section 110 above one another along the longitudinal axis 101.

15. The mixing segment 100, 105 according to one of the preceding embodiments, wherein the inlet section 110 comprises several radial outlets 114, 116, each radial outlet 114, 116 being connected to two first passages 130, wherein, for example, a first passage 130 connected to one radial outlet 114 and a first passage 130 connected to a neighboring radial outlet 116 are both connected to the second passage 140 via a common inlet 143 of the second passage 140.

16. A mixing segment 100, 105 for a static mixer 1, having one inlet section 110, one outlet section 120 disposed opposite of the inlet section 110, a longitudinal axis 101 being defined between the inlet section 110 and the outlet section 120, a radial mixing chamber 140 having two or more separate inlets 143 for receiving two or more components 11, 12 of a multi-component material and at least one outlet 145 for outputting a mixture of the at least two components 11, 12, wherein the inlets 143 are positioned with respect to the longitudinal axis 101 at a radially outer portion of the radial mixing chamber 140 and the outlet 145 is positioned with respect to the longitudinal axis 101 at a radially inner portion of the radial mixing chamber 140, preferably wherein the outlet 145 is arranged coaxial to the longitudinal axis 101, wherein the individual inlets 143 are connected to separate mixing passages 160 that are in fluid connection with the inlet section 110.

17. A static mixer 1, 2, 3, 4 having one or more mixing segments 100, 105 in accordance with one or more of the preceding embodiments, the static mixer 1, 2, 3, 4 having an inlet portion 20 with two or more inlets 22 that are configured to guide a respective multi-component material 11, 12 to the inlet section 110 of a first mixing segment 100.

18. The static mixer 1, 2, 3, 4 according to embodiment 15, wherein the inlet portion 20 is configured to guide a first component 11 of the multi-component material to at least one first radial outlet 114 of the inlet section 110 of the first mixing segment 100 and a second component 12 of the multicomponent to at least one second radial outlet 116 of the inlet section 110 of the first mixing segment 100.

19. The static mixer 1, 2, 3, 4 according to embodiment 15, wherein the inlet portion 20 is configured to guide the first component 11 of the multicomponent material to a plurality of first radial outlets 114 of the inlet section 110 of the first mixing segment 100 and the second component 12 of the multicomponent material to a plurality of second radial outlets 116 of the inlet section 110 of the first mixing segment 100, wherein the first radial outlets 114 and the second radial outlets 116 are alternately located next to each other.

20. The static mixer 1, 2, 3, 4 according to one of embodiments 18 to 19, wherein the inlet portion 20 has a double-walled longitudinal section 24 that guides the first component 11 of the multicomponent material via a center tubular chamber 25 to the at least one first radial outlet 114 and the second component 12 of the multi-component material via at least one annular outer chamber 26 surrounding the center tubular chamber 25 to the at least one second radial outlet 116.

21. The static mixer 1, 2, 3, 4 according to one of embodiments 15 to 20, having two or more mixing segments 100, 105 according to one or more of embodiments 1 to 14, wherein the outlet section 120 of one of the two or more mixing segments 100, 105 is adjoined to the inlet section 110 of a neighboring mixing segment 100, 105 by a single tubular channel 40 guiding a mixture of the first and second component 11, 12.

22. The static mixer 1, 2, 3, 4 according to one of embodiments 15 to 21, having two mixing segments 100, 105 according to one or more of embodiments 1 to 14, wherein the mixing segments 100, 105 directly adjoin one another without any further mixing elements 50, 100, 105 in between.

23. The static mixer 1, 2, 3, 4 according to one of embodiments 15 to 21, having two mixing segments 100, 105 according to one or more of embodiments 1 to 14, wherein a further type of mixing segment 50 is arranged between the two mixing segments 100, 105.

24. The static mixer 1, 2, 3, 4 according to embodiment 23, the further type of mixing segment 50 having a longitudinal tubular section 51 with a helical inner wall 52.

25. The static mixer 1, 2, 3, 4 according to one of embodiments 22 to 24, wherein the mixing segments 100, 105 are rotated with respect to one another.

26. The static mixer 1, 2, 3, 4 according to one of embodiments 22 to 24, wherein the mixing segments 100, 105 are aligned parallel with each other.

The invention claimed is:

1. A mixing segment for a static mixer, comprising:

an inlet section;

an outlet section disposed opposite of the inlet section;

a longitudinal axis being defined between the inlet section and the outlet section;

a plurality of first passages, each first passage adjoining the inlet section and being arranged radially with respect to the longitudinal axis;

at least one second passage adjoining the outlet section and being arranged radially with respect to the longitudinal axis; and a plurality of longitudinal passages, each longitudinal passage of the plurality of longitudinal passages being arranged in parallel with respect to the longitudinal axis and connecting one or more of the plurality of first passages with the second passage, the plurality of first passages being in fluid connection with the second passage, with flow paths being defined between the inlet section, the first passages, the second passage and the outlet section, and two or more first passages of the plurality of first passages being adjoined to one longitudinal passage of the plurality of longitudinal passages.

2. The mixing segment according to claim 1, wherein the outlet section is arranged in a central portion of the mixing segment at the longitudinal axis, the second passage comprises an outlet that is adjoined to the outlet section of the mixing segment at a radially inner part of the second passage, and the outlet section comprises a longitudinal cylindrical section and the second passage is radially connected to the longitudinal cylindrical section.

3. The mixing segment according to claim 1, wherein the second passage comprises at least two inlets, each of the at least two inlets is connected to at least one of the first passages, and the at least two inlets are located at a radially outer part of the second passage.

4. The mixing segment according to claim 1, wherein the second passage is centered around the longitudinal axis and has a cylindrical shape.

5. The mixing segment according to claim 1, wherein the second passage is a first second passage and the mixing segment includes a second second passage arranged radially with respect to the longitudinal axis, the first second passages is connected to a first longitudinal segment of the outlet section and the second second passage is connected to a second longitudinal segment of the outlet section, the second longitudinal segment being located from the first longitudinal segment in a downstream direction along the longitudinal axis.

6. The mixing segment according to claim 5, wherein the first second passage and the second second passage are a first plurality of second passages arranged radially and being connected to the first segment of the outlet section, and the mixing segment includes a second plurality of second passages arranged radially and being connected to the second segment of the outlet section.

7. The mixing segment according to claim 5, wherein the first passages are adjoined to the inlet section above each other along the longitudinal axis.

8. The mixing segment according to claim 5, wherein the first second passage and the second second passage are a first plurality of second passages arranged radially and being connected to the first segment of the outlet section, and the mixing segment includes a second plurality of second passages arranged radially and being connected to the second segment of the outlet section, passages of the first plurality of second passages and passages of the second plurality of second passages are alternately located circumferentially around the longitudinal axis.

9. The mixing segment according to claim 5, wherein the first passages are adjoined to the inlet section above each other along the longitudinal axis, such that between two and four first passages are connected to one of the first second passage and the second second passage.

10. The mixing segment according to claim 9, wherein three first passages are connected to one of the first second passage and the second second passage.

11. The mixing segment according to claim 1, wherein the longitudinal passages are separate tubes.

12. The mixing segment according to claim 1, wherein the inlet section is arranged in a central portion of the mixing segment, the inlet section comprises a longitudinal cylindrical section, and the plurality of first passages are radially connected to the cylindrical section.

13. The mixing segment according to claim 1, wherein the first passages are separate tubes.

14. A static mixer comprising:

a mixing segment in accordance with claim 1; and an inlet portion with at least two inlets configured to guide a respective multi-component material to the inlet section of the mixing segment.

15. A static mixer according to claim 1, wherein the mixing segment is a first mixing segment and the static mixer comprising a second mixing segment, wherein a further type of mixing segment is arranged between the first and second mixing segments, the further type of mixing segment has a longitudinal tubular section with a helical inner wall.

16. The mixing segment according to claim 1, further comprising a plurality of longitudinal passages, each longitudinal passage of the plurality of longitudinal passages being arranged in parallel with respect to the longitudinal axis and connecting one or more of the plurality of first passages with the second passage, and the longitudinal passages are arranged circumferentially around the longitudinal axis in an annular peripheral portion of the mixing segment surrounding the longitudinal axis.

17. A mixing segment for a static mixer, comprising:

an inlet section;

an outlet section disposed opposite of the inlet section;

a longitudinal axis being defined between the inlet section and the outlet section;

a plurality of first passages, each first passage adjoining the inlet section and being arranged radially with respect to the longitudinal axis; and at least one second passage adjoining the outlet section and being arranged radially with respect to the longitudinal axis;

the plurality of first passages being in fluid connection with the second passage, with flow paths being defined between the inlet section, the first passages, the second passage and the outlet section, the plurality of first passages includes a first tier of first passages and second tier of first passages, the first and second tiers arranged along the longitudinal axis, the first passages of the first tier and the first passages of the second tier are pairwise connected to the inlet section above one another along the longitudinal axis.

18. A mixing segment for a static mixer, comprising:

an inlet section;

an outlet section disposed opposite of the inlet section;

a longitudinal axis being defined between the inlet section and the outlet section;

a plurality of first passages, each first passage adjoining the inlet section and being arranged radially with respect to the longitudinal axis; and at least one second passage adjoining the outlet section and being arranged radially with respect to the longitudinal axis;

the plurality of first passages being in fluid connection with the second passage, with flow paths being defined between the inlet section, the first passages, the second passage and the outlet section, the inlet section comprises a plurality of radial outlets, each radial outlet of the plurality of radial outlets being connected to two first passages of the plurality of first passages, and a first first passage of the plurality of first passages connected to a first radial outlet of the plurality of radial outlets and a second first passage of the plurality of first passages connected to a neighboring second radial outlet of the plurality of radial outlets are both connected to the second passage via a common inlet of the second passage.

* * * * *